United States Patent [19]

Rivere et al.

[11] 3,906,207

[45] Sept. 16, 1975

[54] CONTROL SYSTEM OF THE ANALOGUE-DIGITAL-ANALOGUE TYPE WITH A DIGITAL COMPUTER HAVING MULTIPLE FUNCTIONS FOR AN AUTOMOBILE VEHICLE

[75] Inventors: Jean-Pierre Rivere; Bernard Bertuol; Claude Leichle, all of Billancourt, France

[73] Assignees: Regie Nationale des Usines Renault, Billancourt; Automobiles Peugeot, Paris, both of France

[22] Filed: May 10, 1973

[21] Appl. No.: 358,963

[30] Foreign Application Priority Data
May 10, 1972 France .............................. 72.16823
Oct. 21, 1972 France .............................. 72.38208

[52] U.S. Cl. ........ 235/150.2; 73/117.3; 123/32 EA; 235/150.21
[51] Int. Cl.² .................. G06F 15/50; G01M 15/00
[58] Field of Search .......... 235/150.2, 151.3, 151.1, 235/151, 150.21; 340/172.5; 444/1; 73/116, 117.2, 117.3, 119 R, 119 A; 123/32 AE, 32 EA

[56] References Cited
UNITED STATES PATENTS

| | | | |
|---|---|---|---|
| 3,485,093 | 12/1969 | Muller et al. ................ | 235/150.2 X |
| 3,683,683 | 8/1972 | Demidov et al. .............. | 73/117.3 X |
| 3,722,265 | 3/1973 | Metz et al. ........................ | 73/117.3 |
| 3,731,070 | 5/1973 | Urban ................................ | 444/1 X |
| 3,750,465 | 8/1973 | Howell et al. ...................... | 73/117.3 |
| 3,816,717 | 6/1974 | Yoshida et al. ................. | 235/150.21 |

*Primary Examiner*—Joseph F. Ruggiero
*Attorney, Agent, or Firm*—Stevens, Davis, Miller & Mosher

[57] ABSTRACT

A control system of the analogue-digital-analogue type for an automobile vehicle comprising a multiple-function digital computer of the function-generation type comprising a central unit coupled to the various members of the vehicle by a plurality of information detectors and by a plurality of control circuits intended to transmit to the said members functional instructions.

14 Claims, 19 Drawing Figures

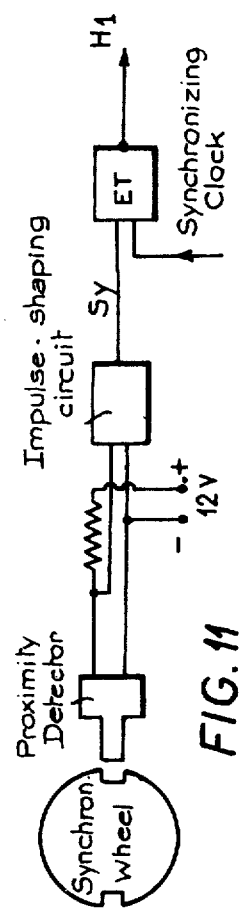
FIG. 11
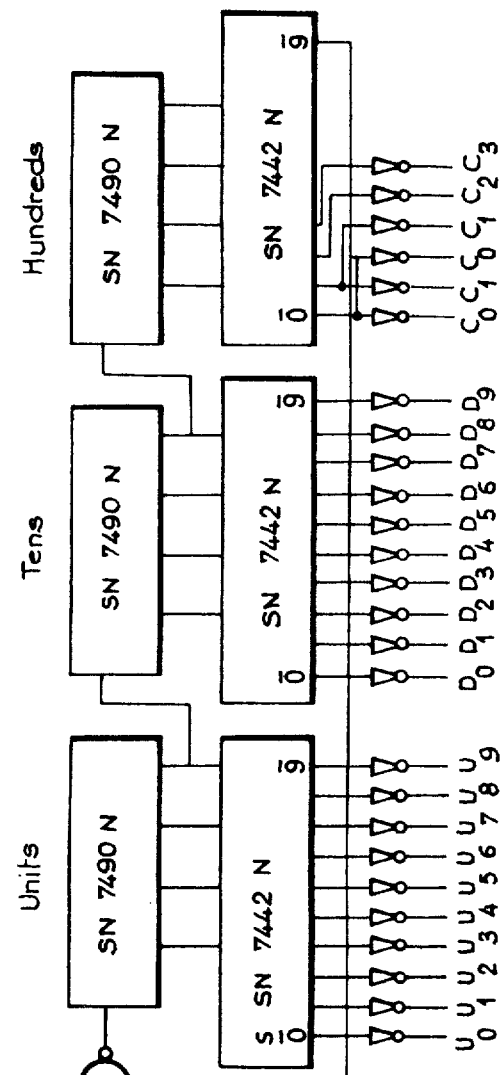
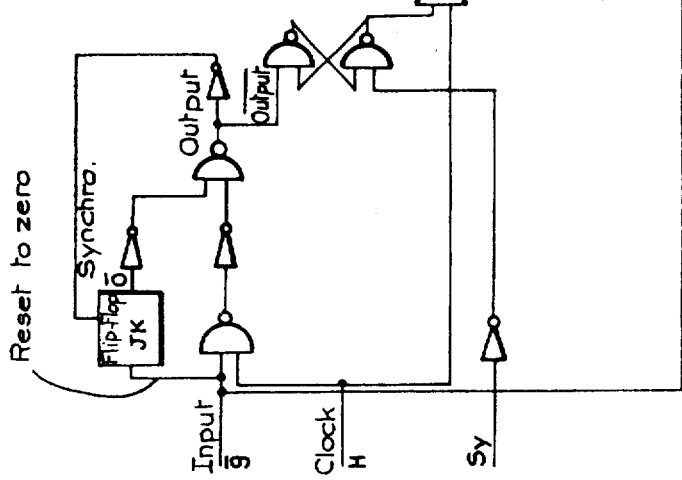
FIG. 12

CONTROL SYSTEM OF THE ANALOGUE-DIGITAL-ANALOGUE TYPE WITH A DIGITAL COMPUTER HAVING MULTIPLE FUNCTIONS FOR AN AUTOMOBILE VEHICLE

The present invention relates to a control system of the analogue-numerical-analogue type with a central digital computer, intended to ensure the control of the various functions of an automobile vehicle.

The progress made in electronics, in particular in the direction of reliability, reduction of overall size and reduction of the production cost of the components on the one hand, and in addition, the increasing requirements in respect of control of pollution, safety, and driving conditions, have made it necessary to contemplate the control of such functions by means of a programmed central computer, ensuring the rapidity, precision and simultaneous action of these functions of control and operation which are provided by electronic means.

The use of these means in automobile technique has encountered up to the present time the numerous obstacles of the conditions inherent in this technique, which has remained essentially mechanical, in particular the adaptation of electronic means to the highly complex physical phenomena relating to the operation of an automobile, in the absence of common points between these techniques, their requirements and their language, and especially to the translation of these phenomena into electronic language and to their control by electronic means.

Reference has been made to numerical computers utilized in electronic injection devices intended to control the opening time of injectors. These devices only carry out a quite special function of the vehicle engine, and their limited purpose renders their relative cost large, which has up to the present time adversely affected their diffusion. More economical simplified models have been produced for example, following the method of electronic selection of control forming the object of French Patent No. 71/18,125 of May 19, 1971 in the name of the present Applicants.

Applications of electronic control to the transmission of the vehicle are also known, as described for example in French Patent Nos. 1,453,300 and 1,457,550, and also in French Patent Applications Nos. 71/28,168, 70/43.696 and its Addition No. 71/19,897 also in the name of the present Applicants (U.S. Pat. Nos. 3403747 and 3403587 and 267,208 of June 28, 1972 and 204,214 of Dec. 2, 1971).

In this case also, specific electronic control means are utilized for particular functions of the vehicle.

Safety devices, especially braking and control of skidding also form the subject of electronic controls.

The object of the present invention is a control system with a digital central computer for an automobile vehicle, providing a synthesis of the above functions which have up to the present time been carried out by separate devices. In the most general case, these functions are in particular:

- The control of electronic injection;
- The control of mixture richness by analysis of at least one polluent or non-polluent gas entering into the composition of the exhaust gases;
- The control of the point of advance of the ignition;
- The control of injection during deceleration in order to obtain minimum pollution (control of accelerated idling speed, of injection cut-off);
- The control of air injection in the case where a post-combustion reactor or a catalytic bed reactor are employed;
- The thermal protection of the said post-combustion pots or catalytic beds, either by cutting-off the air injection or by-passing the reactors or catalytic pots;
- The measurement of the temperatures, the levels and the pressures of water and oil in order to warn the user of a possible failure of a component such as the water-pump, the oil-pump, the lack of oil or water, etc., with display of the measured quantities on the dashboard;
- Measurement of the speed of rotation of the engine with display on the dashboard;
- Measurement of the speed of the vehicle with display on the dashboard;
- Control of the anti-locking of the wheels by controlling the pressure of the fluid-pressure circuit which conveys the "braking" information;
- Control of anti-skidding of the wheels during acceleration by action on the point of advance of the ignition;
- Control of the automatic clutch;
- Control of the air-conditioning of the vehicle;
- Control of the wear and the temperatures of the brake linings;
- Protection of engines against excessive speed (cutting-off the injection or the ignition above a perfectly definite engine speed);
- Control of the stabilized speed of the vehicle on a motorway;
- Control of the re-circulation of the exhaust gases;
- Automatic display of failures of the detector or the computer (diagnosis);
- The operation and control of lighting, indication and safety devices (locking of doors, putting-on safety belts) etc.

The computer according to the invention is a function-generation computer, the central unit of which operates in real and divided time for the execution of these various functions. It receives the information from a series of so-called primary detectors which translate physical quantities into electrical quantities which can be assimilated by the computer. After treatment of this information, it transmits, by so-called secondary detectors or control members, operation instructions to the various components of the vehicle.

It comprises:

1. A central unit, comprising a calculation block ensuring the following elementary operations:
   - Addition,
   - Complementation of binary numbers (in order to prepare subtractions),
   - Multiplication,
   - Crossing of thresholds,
   - Comparison of numbers,
   - Transfer of information,
   - Calculation of derivatives or integrals.

It will however be noted that in view of the size of the problem on the one hand and of the maximum simplicity to be looked for in the design of the computer on the other hand, it is necessary to define the computer structure as a function of the elementary operations necessary for calculating each of the functions indicated above.

Thus, division is not specified in the list of elementary operations specified above, in view of the cost of the installation necessary for its production and of the prohibitive calculation time which it necessitates. However, the ultimate introduction of a wired divider is not excluded if the need for this became apparent.

2. An analogue-digital converter.

The said calculation block and the said converter operating in real and divided times from calculation programmes ensure a cycle of calculations of each of the functions at least once per revolution of the engine.

3. A set of auxiliary memories containing all the operating constants of the vehicle (for example, as regards the engine, the mixture-richness cards and the advance of the ignition).

At the same time as these auxiliary memories, the access means of the computer are especially characterized as regards the temperatures, by the use of logarithmic amplifiers, permitting for example the conversion of the value of a resistance to a voltage proportional to the temperature, this voltage being then treated by the converter.

Thus, this assembly of arrangements ensures the production of a computer which enables the introduction of several programmes, each controlling a different function, so that each of the functions is calculated at least once per engine-cycle.

The production of the various functions of the computer will necessitate the following detectors or control devices:

a. Primary detectors

By primary detectors, there will be understood those which ensure the translation of a physical quantity to an electrical quantity which can be assimilated by the computer. There are in particular the following detectors:
- Continuous or threshold temperature detectors:
  - of engine water and engine oil,
  - of the brake friction-linings,
  - of air admitted to the engine,
  - of the post-combustion reactor,
  - of the interior space of the vehicle.
- Continuous or threshold pressure detectors:
  - of air admitted downstream of the engine oil butterfly-valve,
  - of engine water,
  - of the fluid of the braking circuit.
- Speed detectors:
  - of rotation of the engine,
  - of rotation of the vehicle wheels.
- Detectors of analysis of exhaust gases:
  - Carbon monoxide,
  - Oxygen,
  - Carbon dioxide,
  - Oxides of nitrogen.

(See for example French Patent Application No. 71/22690 and its Addition in the name of the present Applicants) (U.S. pat. appl. No. 264,333 of June 19, 1972).

b. Control members

The control members permit the conversion of an electrical quantity resulting from a calculation of the vehicle computer to a physical quantity controlling a function of the vehicle. These are especially the following devices:

- Electro-magnetic injectors;
- Electronic ignition devices;
- Electro-valves: regulation of air injection at the exhaust of by-pass of thermal or catalytic reactors;
  - of the by-pass of the braking circuits;
  - of control of deceleration (accelerated idling);
  - regulation of re-circulation of exhaust gases.
- Electro-magnets for priority control of the butterfly-valve.
- Light indicators arranged on the dashboard and permitting the indication in a simple manner (possibly numerical) of anomalies:
  - of pressure
    - of engine water,
    - of engine oil,
    - of fluid in the braking circuits.
  - of temperatures
    - of engine water,
    - of engine oil,
    - of brake friction-linings.
  - of the levels:
    - of engine oil,
    - of engine water,
    - of fluid in the braking circuits.
  - of the wear of the brake linings
  - of excessive engine speed
  - of defective operation of the computer
  - Speed indicator (of rotation of the vehicle engine).
  - Air-conditioning compressor of the heating circuit supplied by the engine.

Thus constructed and connected to the vehicle with its cyclic operation in divided time, with its simplified means common to all the functions (converter and calculation block) or to a number of functions (detectors) and its structure also simplified, specific to the carrying-out of the said functions, the computer forming the object of the invention leads to a production cost which is compatible with mass production of automobile vehicles, while the price and the type of construction of known ordinators render this application difficult to envisage up to the present day.

The combination of the structure of the computer and the choice of the access and detection means of the computer forming the subject of the invention permits great rapidity of treatment necessary for effectively controlling the transient phenomena of the engine and the vehicle. This control is made possible by the rapidity of calculation of the whole of the functions (less than one ms) combined with the rapidity of detection of information, especially information relating to speed and pressure.

It is furthermore possible to propose the utilization of a mixed computer for the injection time and ignition point of heat engines, the said computer especially incorporating the elements referred to above.

It is known that recourse is being made more and more to methods of electronic injection of the air-fuel mixture directly into the combustion chamber of heat engines, or indirectly into the admission pipes. These methods require especially a regulation of the operating richness of the mixture. The regulation systems known at the present time are not sufficiently accurate and do not permit good reproducibility in mass production, either due to the fact that the detectors do not permit this accuracy to be obtained functionally, or that the conception of the treatment of the information effected following the data supplied by the said detectors does not permit this object of precision to be attained.

The traditional commercial systems have generally poor response times and the regulation of the richness is inaccurate during transient phases, which however represent the most important part of the utilization of the vehicle engine.

The known solutions do not enable measurement to be made of the mass flow of air introduced into the cylinders, and this is replaced by constant depression measuring systems or by systems for measuring the manifold pressure, the air temperature and the engine speed, or even the volumetric flow without correction for air temperature and barometric pressure, so that the equivalent measurement does not exactly represent the mass of air introduced into the engine. It follows that the treatment of the information cannot restore an exact result as regards the richness.

The object to be attained is to remedy the above-mentioned drawbacks by utilizing exact measurement means for the mass flow, with which there is associated a high performance computer utilizing the data of the detector; the said computer must carry out the calculations of richness (expressed in injection time for example) as rapidly as possible, in synchronism with the suction of the cylinders. There is then adopted an arithmetic computer comprising a calculation block, a control block, systems of conversion of data at the input of the computer (a synchronous sampling device in particular). Taking into account the importance of the sampling device, this latter is employed in real and divided time for all the measurements carried out on the engine.

The computer is designed for a specific application on a conventional internal combustion engine since:
- the teeth of the starter ring are utilized for measuring the speed of the engine and for carrying out position checks (calculation of the ignition advance in particular);
- Top-Dead Centre and Bottom Dead Centre signals are used in order to synchronize the calculation sequences with the suction phases of the engine (the response time of the computer is therefore a half-revolution of the crankshaft);
- the information of mass flow is utilized;
- the information of water temperature is used to carry out the function "enrichment during the heating phase of the engine."

All known internal combustion engines work on the same principle and it is clear that any engine may be represented by a system of constants (recorded in a permanent memory) and that the treatment processes are identical from one type of engine to the other. This fact has furthermore repercussions on the structure of the computer according to the invention, which does not comprise any working memory but only a few buffer registers which retain in a fleeting manner the intermediate data or calculations.

It will further be noted that the computer forming the object of the present alternative is designed not only to treat the functions of ignition advance and richness of the carburetted mixture, but also for treating all the known functions on a vehicle which have previously been enumerated.

The structure of the system of control forming the object of the invention and in particular of its computer will be brought out in the description which follows below with reference to the accompanying drawings in which:

FIG. 11 shows the method of generating the signals $S_y$ and $H_1$;

FIG. 12 shows the ordinal counter of the X control unit;

Structure of the Computer

Figure 1:
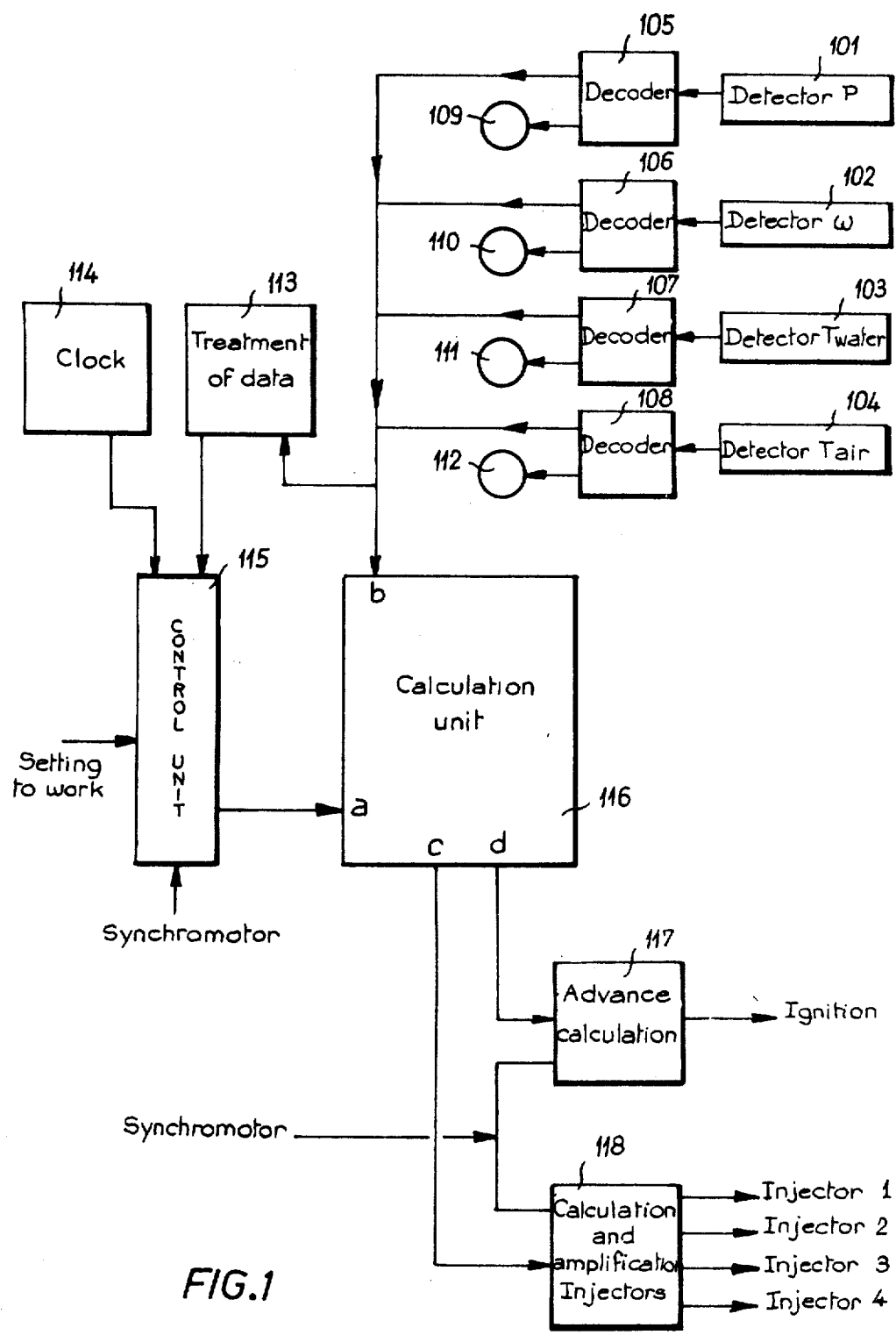
FIG. 1 represents a synoptic diagram of the control system of the parts of the vehicle according to the invention.

The calculation, control and memory functions utilized (see FIG. 1):

a. The primary detectors (this list is not limitative as in the diagram of FIG. 1).

Each detector having the purpose of converting any physical quantity (temperature, pressure, speed, etc.) to an electrical quantity which is proportional (or not proportional) to this quantity, it is necessary to convert the analogue voltage delivered by the detector to a digital quantity in an appropriate code which can be assimilated by the calculating unit when the computer is purely digital. The analogue-digital converters for treatment of data (see FIG. 7) have therefore been shown.

b. The electronic assembly of the calculation unit (FIG. 3) comprising the following devices:
- A multiplier of two numbers of 10 binary figures as a maximum with memorization of these two numbers during the time for which the operation lasts, and memorization of the result up to the wipe-out order;
- an adding device for two numbers of 10 binary figures as a maximum with memorization of these two numbers up to the wipe-out order, and memorization of the result up to the wipe-out order;
- multiplexing devices for the various numbers which it is desired to multiply. There are provided at least two multiplexers, one for the multiplier and the other for the multiplicand. It will be recalled that a multiplexer is a device permitting the selection at its output of an input information from $n$ informations which are simultaneously presented at its input under the control of a selection signal applied to an input selection line from amongst *n;*
- multiplexers for the various numbers which it is desired to add; there are provided at least two multiplexers, one for each of the two numbers;
- a live memory of 10 binary figures connected to an input of each of the multiplexers, of the multiplier, including the wipe-out information of the output memory of the multiplier;
- a live memory of 10 binary figures connected to an input of one of the multiplexers of the adding device, the wipe-out information coming from the output memory of the algebraic adding device.

c. Memory units, the whole of the fixed memory or so-called dead type, carrying out the function of memorizing the various coefficients characteristic of the vehicle and the engine. Each of the coefficients is written in 8 binary figures. It is obvious that the number of binary figures used depends on the accuracy which it is desired to obtain.

d. Operating units ensuring the control, as a function of the various information of the calculation unit, the memory unit and the memories for inscription of the results for the purpose of calculating the functions, for example calculation of the injection time and of the time determining the advance of the ignition, which calculation is made every half-revolution of the engine.
- Taking into account the complexity of the apparatus and the possibility of faults, it is necessary that the control system should be able to determine and to indicate in the first place the failures of the information detectors; these may be displayed on the dashboard by means of a light indicator or a combination of light indicators, and providing for the introduction of a failure test in the programming.
- When the physical quantity measured is known in the digital form, it is necessary to retain its digital value in a register for the whole of the time necessary for its utilization.
- The detector or detectors of speed, temperature, pressure may address a fixed memory containing a system of coefficients proper to the vehicle; only this fixed memory will be different from one vehicle to another by its contents, all the other circuits being invariable from one vehicle to the other. The operation of this memory will be explained later. The addressing of this memory may be effected by appropriate coding of a group of information delivered from the primary detectors.
- The information delivered by the detectors on the one hand and by the fixed memory on the other are transferred to the input of the calculation unit by means of the multiplexers. The calculation unit proper is intended to carry out the overall functions following: algebraic addition and multiplication.
- The calculation unit is actuated by a programme unit in which are recorded the calculation programmes of the various functions which are required.
- At the output of the calculation unit is located a group of registers containing the calculation results; these registers have the purpose of retaining the calculated information for all the time required for their utilization in order to ensure the desired function or functions.

At the end of the chain are located the electromechanical transducers permitting the calculated numerical quantities to be converted to physical quantities, the utilization of these quantities being cadenced by a system of external conditions and by various synchronizations entered in the block-programme.

General diagram and operation of the computer

The computer forming the object of the invention comprises (see FIG. 1):
- A calculation unit 116, the basic cell of the apparatus.
- An operating unit 115 which regulates the operation of the said calculating unit.
- Detectors measuring the various parameters (101, 102, 103, 104).
- Decoding devices, converting the information supplied by the above detectors in numbers which can be assimilated by the calculation unit (105, 106, 107, 108).
- Each of these decoders is provided with a system giving a visual indication of the failure of the corresponding detector and permitting the running of the vehicle to continue in spite of this failure (109, 110, 111, 112).
- A clock which cadences the overall operation (114).
- A data treatment unit giving the choice of the calculation to be effected (113) by virtue of the information supplied by the detectors.
- Operating or output members 117 and 118 translating the numbers coming from the computer to information compatible with the controlled members.
-The number of input detectors and output devices (calculation) is only indicated here by way of example and is in no way limitative.

Buffer memories (not shown) may be provided between the decoders and the calculation unit.

The operation of the whole assembly can be deduced from FIG. 1:

The information measured be by detectors and decoded is introduced into the computer at *d*. On the other hand, this same information, analyzed at 113, selects a method of calculation in the form of signals. The latter, introduced into the control unit with the rhythmic signals 114 permit the correct operation of the calculation unit. The results, present at *c* and *d* are then decoded so as to control the external devices, which are in the present example those of the ignition and the injection. This example is in no way limitative as regards the number of devices controlled.

In the detail of each of the devices presented below, the integrated circuits employed belong to the following list taken from the references of the American Company TEXAS INSTRUMENTS INC., the figure following each reference being the corresponding page number of the catalogue sold commercially and entitled: "The Integrated Circuits Catalog" - Fourth Edition - July 1971, of that Company.

| | |
|---|---|
| SN 74 151 N | 9.339 |
| SN 74 150 N | 9.339 |
| SN 74  83 N | 9.271 |
| SN 74  82 N | 9.264 |
| SN 74  96 N | 9.86 |
| SN 74  90 N | 9.4 |
| SN 74  42 N | 9.148 |
| SN 74  74 N | 6.65 |

The binary figures will be hereinafter designated by the Anglo-Saxon term more commonly utilized, namely "bits" (a contraction of "binary digits").

Figure 3:
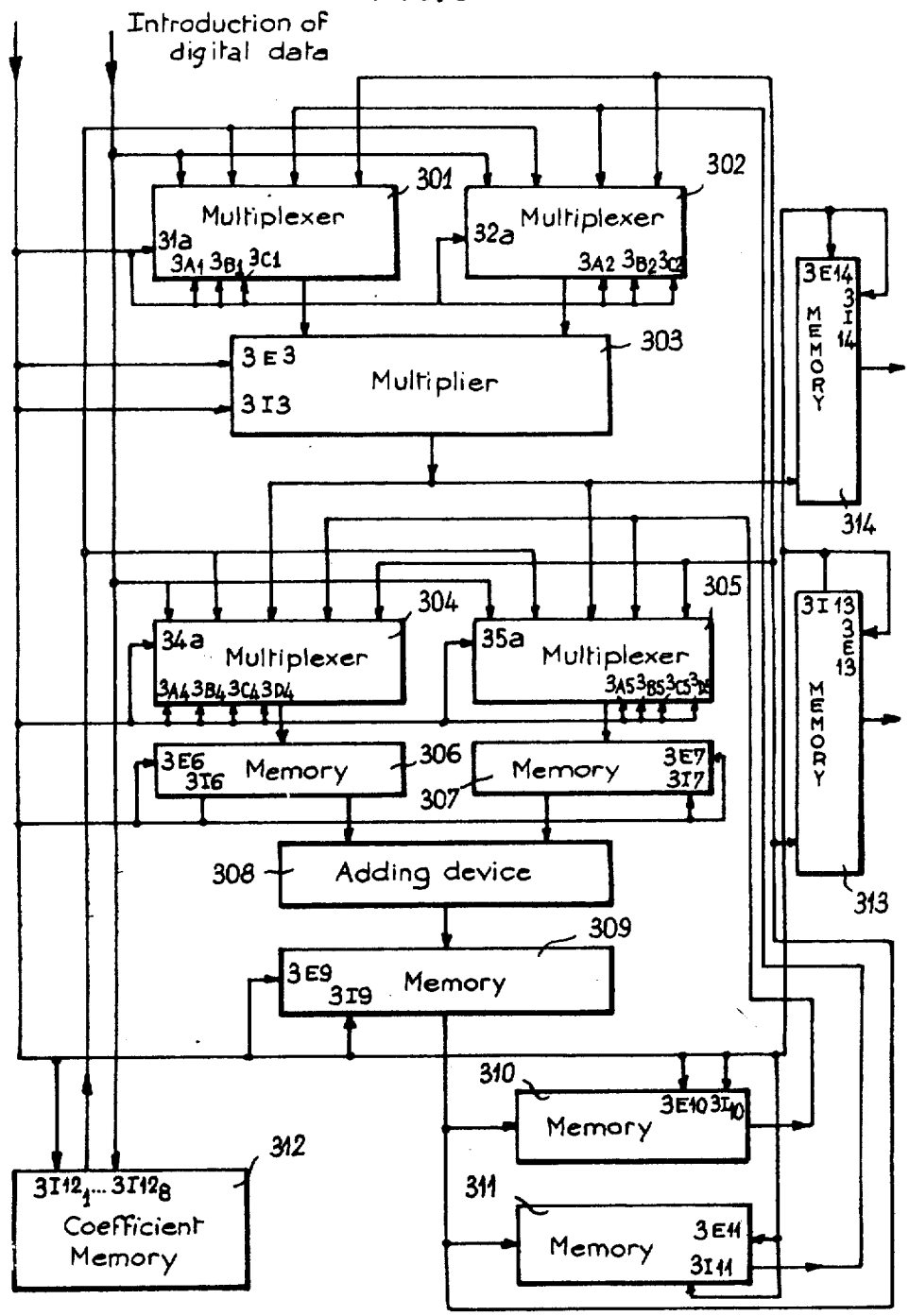
FIG. 3 is a diagram of the calculation unit.

Calculation unit (see FIG. 3)

This unit comprises:
- An adding device 308 and its inputs and outputs.
- A multiplier device 303 with its inputs and outputs.
- Buffer memories 310 and 311 which temporarily record the result of the calculation.

The line "Introduction of digital data" is functionally connected to the outputs of the buffer memories interposed between the information detectors and the calculation unit.

The multiplexers 301 and 302 supply at their outputs the multiplier and the multiplicand of the multiplication to be carried out, while the multiplexers 304 and 305 supply the two numbers to be added.

1. The adding device (see FIG. 3)

The adding device 308 must permit the addition of two numbers of 10 binary figures. It is only necessary to display them at 308 at the input so as to have the result at the output (to within the transfer time).

It is formed for example by two circuits of the type SN 7483 N which add together 4 binary figures each and of a circuit which adds together 2 binary figures, or 10 binary figures in all, this latter being for example a circuit of the type SN 7482 N.

In order to carry out subtractions, there is employed the representation of negative numbers, known as the complement, but in order to facilitate this representation, the restricted complements are employed which are obtained by replacing each binary figure by its opposite. This arrangement only changes the accuracy by about two thousandths.

In order to carry out a subtraction (A–B), there is added to A the complement of B; the result is to be utilized without subsequent modification; if it 0, there will be an error on the last bit; if it is negative, the carry over is zero. It is called Cr and is utilized for testing one number with respect to another.

Multiplexers 304 and 305 with 16 inputs are sufficient for the multiplexing of the inputs of the adding device.
- Each of the input signals is composed of 10 bits.
- Integrated circuits of the type SN 74 150 N are chosen for each of the two multiplexers 304 and 305.

The transfer of the information is effected by an information 0 on the wires 34a and 35a (probe of 304, probe of 305). An inverter is added in order to have controls for +1 informations. There is understood by "probe" a circuit input which ensures a synchronizing function permitting the execution of an order, even if this is not released at the level of the said circuit.

An input is chosen from the 16 possible inputs by means of appropriate coding combining two of the four wires 3A4, 3B4, 3C4, 3D4 and 3A5, 3B5, 3C5, 3D5, for each of the multiplexing devices 304 and 305.

An the inputs and at the output of the adding device are placed memories 306 and 307 of the same type as those used as buffer memories (see below).

Figure 2:
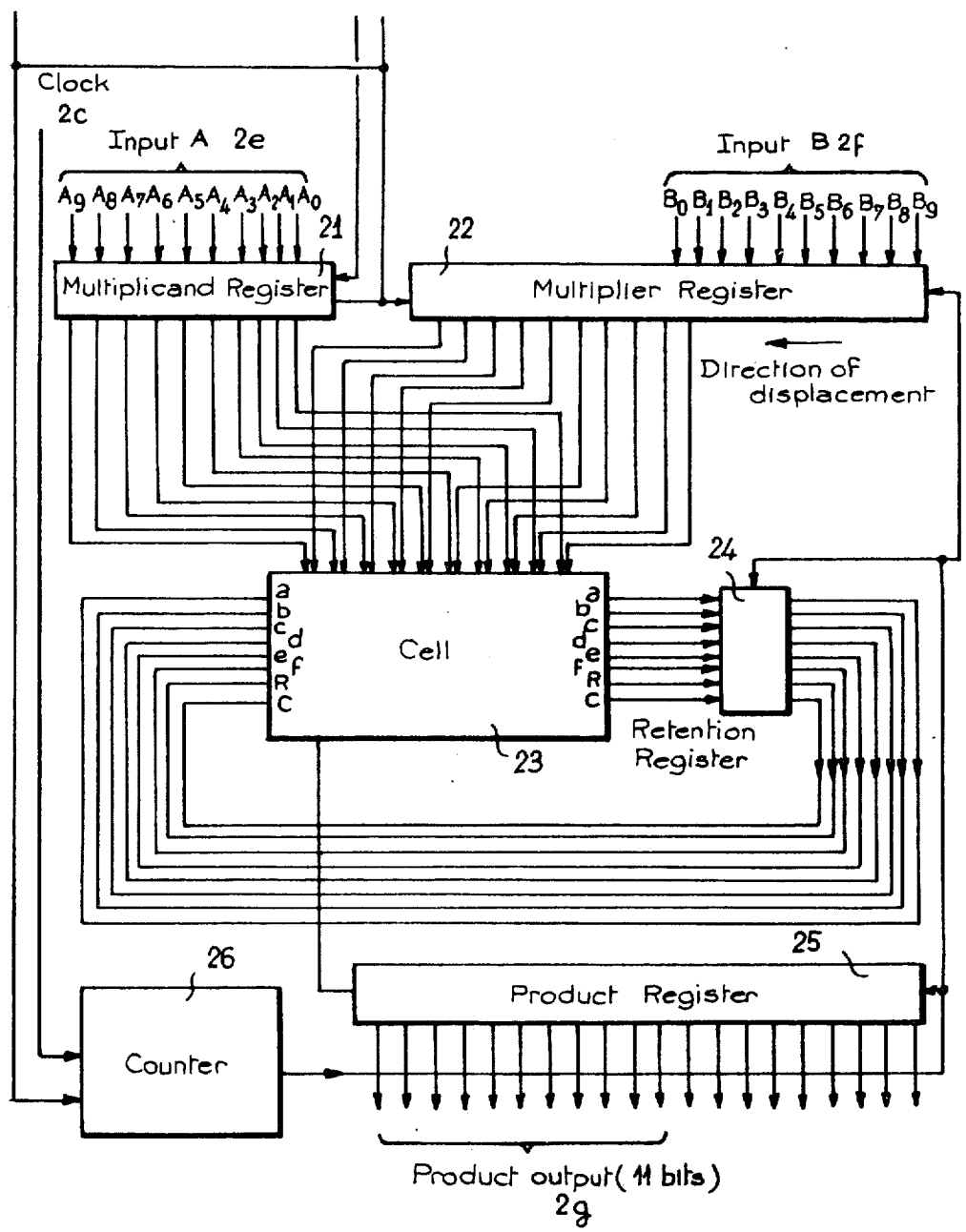
FIG. 2 shows a general diagram of the multiplier of the calculation unit.

2. The multiplier (FIGS. 2 and 3)

In the design of such a unit, two essential factors are to be considered. These are:
- Rapidity of execution (time)
- Complexity of the circuit and its volume (space)

It should be observed that these factors are closely bound-up and vary in the same direction.

In the particular case of an automobile vehicle, even for a clock frequency of 1 MHz, the necessary time is amply available, but on the other hand, the available volume is limited.

The multiplier (FIG. 2) operates following the principle of binary multiplication:

To multiply two binary numbers A and B:

The multiplication of the number A by a binary FIG. Bi (of row i of the binary number B) has for a result either A displaced by $i$ rows towards the left, or 0, depending on whether Bi=1 or Bi=0.

The multiplication bit by bit is brought to an "AND" function between each bit of the word A and Bi bit of the word B.

Technique employed:

The numbers A and B to be multiplied are of 10 bits. These will be written:

$A = A_9 \, A_8 \ldots A_0$
$B = B_9 \, B_8 \ldots B_0$

If the formal product of A for B is written in the form: $A.B = P_{19} \, P_{18} \ldots P_0$, these binary figures $P_{19}, P_{18} \ldots P_0$ are determined in the following manner:

$A_9 \, A_8 \, A_7 \, A_6 \, A_5 \, A_4 \, A_3 \, A_2 \, A_1 \, A_0 =$
$B_9 \, B_8 \, B_7 \, B_6 \, B_5 \, B_4 \, B_3 \, B_2 \, B_1 \, B_0$

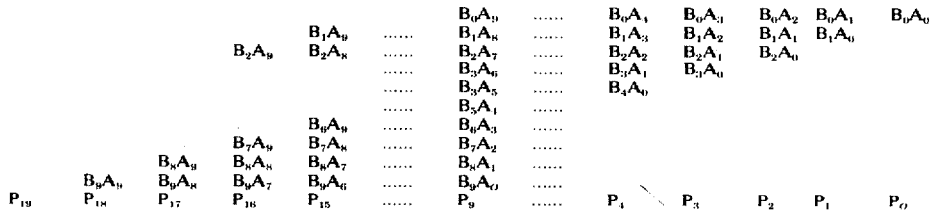

It should be observed that it is not possible to add more than 3 binary numbers of the same mass $n$, the mass being the number of binary figures of the number in question expressed in binary code, for example if it is desired to have a result limited to 2 figures, S of mass $n$ and the other R of mass $n+1$, namely:

$$X_{1n} + X_{2n} + X_{3n} = R_{n+1} + S_n$$

in which S is the row bit of the sum, and R is the row bit ($n+1$) equivalent to a carry-over.

There is given below the example of the principle of obtaining results for numbers of 3 bits by putting:

$$y = (y_2, y_1, y_0) \text{ and } x = (x_2, x_1, x_0)$$

in which:

$$x = x_2 \cdot 2^2 + x_1 \cdot 2^1 + x_0 \cdot 2^0$$

and:

$$y = y_2 \cdot 2^2 + y_1 \cdot 2^1 + y_0 \cdot 2^0$$

The result of the multiplication of $x$ by $y$ is a number with a maximum of 6 bits. We have:

|  |  |  |  | $x_2$ | $x_1$ | $x_0$ |
|---|---|---|---|---|---|---|
|  |  |  |  | $y_2$ | $y_1$ | $y_0$ |
|  |  |  | $x_2y_0$ | $x_1y_0$ | $x_0y_0$ |
|  |  |  | $x_1y_1$ | $x_0y_1$ |  |
|  |  | $x_2y_1$ | $x_0y_2$ |  |  |
|  | $x_2y_2$ | $x_1y_2$ |  |  |  |
| $P_5$ | $P_4$ | $P_3$ | $P_2$ | $P_1$ | $P_0$ |

$x.y = P = P_5 \cdot 2^5 + P_4 \cdot 2^4 + P_3 \cdot 2^3 + P_2 \cdot 2^2 + P_1 \cdot 2^1 + P_0 \cdot 2^0$ which leads to the following process:

$$P_0 = x_0 \cdot y_0$$

$$P_1 = (x_1 y_0 + x_0 y_1) + R_1$$

in which $R_1$ is the carry-over from row 1.

$$P_2 = (R_1 + x_2 y_0 + x_1 y_1 + x_0 y_2) + R_2 + R'_2$$

in which $R_2$, $R'_2$ are the carry-overs from row 2.

$$P_3 = (R_2 + R'_2 + x_2 y_1 + y_2 x_1) + R_3 + R'_3$$

in which $R_3$ and $R'_3$ are the carry-overs from row 3.

$$P_4 = (R_3 + R'_3 + x_2 y_2) + R_4$$

in which $R_4$ is the carry-over from row $R_4$ and $P_5 = R_4$

In view of the foregoing remarks, the preparation of $P_9$ (addition of the maximum of factors $A_K$ $B_1$) is effected as follows:

$a_9, B_9, C_9 \ldots R_9$ were generated during the preparation of $P_9$.

| $B_0A_9$ $+B_1A_8$ $+B_2A_7$ | } $S_1$, carry-over $a_9$ | $+S_1$ $+S_2$ $S_3$ | } $S_3$, carry-over $e_9$ | $A_0B_9$ $+a_9$ $+e_9$ | } $S_5$ carry-over $f_9$ |
|---|---|---|---|---|---|
| $B_3A_6$ $+B_1A_5$ $+B_5A_4$ | } $S_2$, carry over $b_9$ | $a_9$ $+b_9$ $+c_9$ | } $S_{abc}$, carry-over $d_9$ | $f_9$ $+S_1$ $+S_{abc}$ | } $S_6$, carry-over $g_9$ |
| $B_6A_3$ $+B_7A_2$ $+B_8A_1$ | } $S_3$, carry-over $c_9$ |  |  |  |  | and finally:

| $S_5$ $+S_6$ $+G_9$ | } S, carry-over $C_9$ | $S$ $+C_9$ $+P_9$ | } $P_9$, carryover $R_9$ |
|---|---|---|---|

$a_9, b_9, c_9, d_9, e_9, f_9, g_9 \ldots R_9$ serve in the preparation of $P_{10}$.

NOTE:

The carry-overs $a_i \ldots R_i$ are always generated. At the outset $a_i = 0, \ldots R_i = 0$ and during the course of the calculation, these carry-overs assume suitable values.

$S_9$ is the most difficult sum to generate and it is therefore this which determines the basic cell of the multiplier.

This is designed by means of double-adding devices of commercial type (for example an adding device of the type T 152 of the Societe Generale des Semiconducteurs), as defined in the Note of Application NA 14 of that Company, entitled "Arithmetical Operations using the double adding device T 152."

The carry-overs are generated at each operation of the arithmetical cell and they must be stored and regenerated for the next following arithmetical operation. Trigger devices, for example of the type D, ref. SN 74 74 are perfectly suitable for this kind of operation.

The input and output of the multiplier are constituted by:

- A multiplicand register 21: this is in fact an asynchronous register, independent of the clock signals.
- The words to be entered being of 10 bits, integrated circuits of the type SN 74 96 N will be employed.
- A multiplier register 22, constituted by a displacement register followed by a series register. These two registers may for example be of the type SN 74 96 N.

The input in series of the results to the second register requires 21 clock impulses and conditions the duration of the multiplication which necessitates:

- 1 Wipe-out impulse,
- 1 Inscription impulse,
- 21 Clock impulses,
- 1 Impulse for re-setting the counter to zero.

This counter determines the rhythm of calculation and blocks the result in the output register up to a fresh multiplication.

At the 21st clock impulse, the multiplier register is empty, and zeros will therefore be displayed at its output, this permitting carry-overs ($a, b, c, \ldots$) to be generated, which will be in a state permitting the beginning of the next following calculation.

It is also necessary to study the clock impulses which permit multiplication. It is thus necessary to determine the clock frequency in the first place. The said clock frequency is determined by the longest operation to be carried out, namely:

- A displacement of the multiplier register: 40 ns;
- passage through a NAND gate circuit: 15 ns;
- passage through the arithmetic unit, and therefore through 5 adding devices: (5×25) ns or a total of 180 ns.

There may be chosen a frequency of 1 MHz which corresponds to a clock impulse period of 500 ns.

In fact, it would be possible to work at three times this speed if necessary.

From the foregoing study, there is deduced the overall diagram of the multiplier as shown in FIG. 2.

The diagram of FIG. 2 makes it possible to see that the multiplier is composed of:
- a multiplicand register 21 working as a memory;
- a multiplier register 22, working as a displacement register
- a calculation cell 23 permitting of elementary additions;
- a carry-over register 24 enabling the carry-overs between two elementary operations to be memorized;
- a product register 25 working as a series-parallel converter and enabling the result to be memorized;
- a counter 26 permitting the operation of the above assembly.

The cell 23 is constituted by logical gates of the NO-AND or AND type and complete adding devices. The whole assembly of the circuits of this cell enables the multiplication to be carried out following the principles previously stated.

The information introduced is as follows:
- 2e-input A;
- 2f-input B.

These are the two numbers to be multiplied. -2E; resetting to zero of the inputs and wiping-out the numbers previously introduced; -2I: inscription of the numbers to be multiplied; -2c; clock for determining the working speed. -The output: 2g, at which the result is available 23 clock impulses after the beginning of multiplication.

Operation

After re-setting to zero, the input registers by the signal 2E, the simultaneous presence of the numbers to be multiplied at 2e and 2f and of the inscription signal (2I) causes the putting into memory of the numbers inside the multiplier. This same inscription signal 2I causes the starting-up of the counter and the successive displacements which select the numbers passing into the cell, memorizing the carry-overs, will permit the introduction of the result into the product register.

When the result is fully entered in the register 25, the counter is locked, thus permitting the reading of the result. This latter is available until a new inscription signal (2I) is received.

Multiplexers are provided at 8 with inputs at 301 and 302, sufficient for multiplexing the inputs of the multiplier 303 (see FIG. 3).

Each of the inputs is composed of 10 bits.

Integrated circuits are therefore chosen which permit the multiplexing of 8 inputs, for example of the type SN 74 151 N.

As there are 10 bits to be multiplied, the multiplexers 301 and 302 (FIG. 3) are composed of 10 integrated circuits of this same type.

The transfer of the information is controlled by an input 0 on the wires marked 31a and 32a (FIG. 3). A reversing device will be mounted on the probes S6 and S7 in order to have controls for the +1 information.

An input is chosen (that is to say an input signal of 10 bits) from the eight possible, by means of a coding on three wires 3A2, 3B2, 3C2 and 3A1, 3B1, 3C1 for each of the multiplexers 302 and 301 respectively.

3. The buffer memories of the control unit

All the memories are mounted with integrated circuits, for example of the type SN 74 96 N. Each of these circuits permits the memorizing of 5 bits, with input and output in parallel.

For each memory, the wipe-out is controlled by an input marked $3E_6, 3E_7 \ldots 3E_i$, and the inscription is controlled by an input $3I_6, 3I_7 \ldots 3I_i$, where i is the index of the memory.

This is valid for the memories 306, 307, 309, 313, 314, 310, 311; the controls $3I_i$ are in positive logic.

For the controls $3E_i$, reversing devices are added in order to obtain a control in positive logic.

The particular characteristics of the dead memories are determined from the following considerations:

A general study of the problem of injection has brought out the quadratic laws in which appear coefficients a, b, etc. The calculation unit must have these coefficients available in a binary form of words of 8 figures.

The coefficients necessary are variable as a function of the vehicle speed, but it has been possible to divide the range of speed of the engine into levels of 100 r.p.m., inside which the use of a fixed value for a, b, etc., does not lead to calculation results which are outside the tolerances for injection and ignition.

The range of engine speed has been divided into 64 parts, and the calculation necessitates for each of these 8 coefficients of 8 figures, or a total of 64=8=8=4096 binary figures.

It has appeared that a dead memory system could carry out the function of generator of the coefficients.

By way of example of equipment which is suitable for this purpose, there may be cited the memories ROM 0512 of the HARRIS ELECTRONICS COMPANY (Radiation Inc.) which have the advantage of being programmable by the user, in accordance with the technical note of July 1970, entitled "Programmable read-only Memory" published by this Company.

This is a memory of 512 figures consisting of 64 words of 8 binary figures.

The addressing is carried out by the application to the 6 address terminals of the pure binary number representing the number of the word chosen (0 to 63).

Several buffer memories may be connected in parallel, thus enabling the number of words stored to be increased. In this case, the addressing is carried out in parallel on all the memories, the active input of the chosen memory alone passing to the condition 1, by virtue of the inscription signal $3 1 12_i$ of the coefficients memory 312 (see FIG. 3), i being the index of the selected memory.

The coefficient memory may in fact comprise 8 partial memories. According to an alternative form, there could be provided a single memory divided into sub-memories by addressing.

The input address signals of the fixed memories are preceded by a double inversion having only one load factor of one unit.

The output signals being followed by a double inversion in order to ensure an output of 10.

Other types of memories may also be utilized in replacement of those of the example cited.

From the foregoing there is deduced the arrangement of the calculation unit shown in FIG. 3:
- 308: The adding device.
- 304: The multiplexer with 16 inputs and 1 output comprised in the adding device.
- 305: The multiplexer with 16 inputs and 1 output comprised in the adding device formed of 10 integrated circuits SN 74 150 N.
- 312: The coefficients memory.
- 303: The multiplier unit.
- 301: The multiplier.

302: Identical with 301, but it returns the multiplicand to the multiplying unit 303.

306: Memory of the input of a number of the adding device.

307: Identical with 306 for the other input number of the adding device.

309: Identical with 306 for the output of the adding device.

313: Memory of the calculation results of the injection time.

314: Memory of the results of the calculation of the ignition advance.

310: The buffer input memory of the adding device.

311: The buffer input memory of the multiplying device.

OPERATION OF THE CALCULATION UNIT (Refer to FIG. 3)

1. Multiplication of 2 numbers

These 2 numbers given by the information from the detectors and the calculation programme are each present in an input of the multiplexers 301 and 302. The application to each of these latter of the corresponding address of the "probe" signal on 31a and 32a, and of the inscription order of the numbers in the multiplying unit (previously re-set to zero) causes the starting of the multiplication. The result is available, 23 clock inpulses later, on the output of the multiplying device 303.

2. Addition of 2 numbers

In the same way, 2 numbers to be added, from instructions of the calculation programme, treating the information from the detectors, are present on one input of the multiplexers 304 and 305. The application on each of these latter of the corresponding address of the probe signal on 34a and 35b and of the inscription order of the intermediate memories 306 and 307 (previously re-set to zero) causes the presence of the result at the output of the adding device 308. The inscription signal of the output memory 309 (previously re-set to zero) enables this result to be retained for a subsequent use.

3. The memories 310 and 311 are utilized following the same principle (wiping-out by 3 E 10 and 3 E 11 and then inscription by 3 I 10 and 3 I 11) in order to retain the intermediate results and to free the calculating devices for other operations.

The memories 313 and 314 utilized following the same principle, memorize the final results, from one calculation to the other.

The memory 312, of the dead memory type known as "ROM" (read-only memory) contains for example predetermined coefficients. The application of a signal on one of the 8 address wires causes the appearance of the selected number at the output.

INPUTS-OUTPUTS OF THE CALCULATING UNIT

1. Connection of the calculating unit to the control unit

Following a pre-established programme, the control unit emits the signals necessary to the calculating unit, such as:

-Addressing of the multiplexers;
-reading of the selected numbers;
-inscription and wiping-out of the memories.

2. Introduction of data

This is always carried out to the inputs of the multiplexers.

To each input there corresponds a number (such as the pressure for example) and this number is always present there. It will only be used when its address is applied to the multiplexer, together with the reading signal.

3. Reading of results

The results are always present at the output of the memories 313 and 314. At each half revolution of the engine, that is to say after each fresh calculation, the memories are wiped-out and the new values are re-inscribed. The results cannot be utilized during this short period (2 micro-seconds).

CONTROL UNIT

A control unit associated with the calculating unit previously described will be described below.

The control units such for example as that of the injection time and that of the ignition advance treat the external information given by the various detectors following a programme cadenced by an internal clock known as an ordinal counter. It has already been seen that the measurements and calculations were carried out at each half-turn of the crankshaft in the case of the example given.

The counter which gives a rhythmic frequency to the calculations (and the measurements) will begin its cycle at each half-turn of the crank-shaft.

The synchronizing impulse designated by Sy (FIG. 11) given by the detector associated with a rotating member of the engine shaft and followed by its shaping system, will give one impulse per half-turn of the crankshaft in synchronism with a corresponding impulse from a clock of 1 MHz.

At the rising front of this signal Sy which releases the calculation sequence from which for example the injection and ignition will be controlled, there is obtained the first rising front of the rhythmic clock known as H1, which is the first instruction of the programme from which each clock impulse will constitute a particular instruction.

Starting from H1, the counter of the control unit counts the clock impulses and gives, by means of dividers by ten of binary-coded decimal de-coders and inverters, the clock impulses from H$l$ to H$m$, where H$m$ is the last instruction of the programme.

The impulses utilized are synchronous with the 1 MHz clock, and the progress of the calculations requires a maximum of 400, which corresponds in this case to a programme restricted to the calculation of injection times and ignition advance. The counter will become blocked at 999.

The impulse H1 of the counter H1 of the ordinal counter of the control unit has already been defined.

The 1 MHz clock will of necessity be completed before it is returned to the counter, so as to have the counter impulses in phase with the clock (the integrated circuits SN 7490 N, FIG. 12, being triggerd at the falling front of the information).

The blocking system for the clock at the input of the counter is very simple: if the last information is "Sy," the clock increments the counter. The trigger device is obtained by means of two NO-AND gates (trigger circuit JK FIG. 12).

When the clock signals have access to the divider-counter, this access is effected by 10 circuits SN 7490 N corresponding to the units, followed by another circuit type SN 7490 N for the tens and another for the hundreds (see FIG. 11).

The information given by these three dividers is decoded from its binary form, known as BCD to decimal by three circuits SN 7442 N and then reversed in order to obtain the impulses of the ordinary counter in positive logic.

The outputs of these three circuits are known as:
-$U_0$ to $U_9$ for the units;
-$D_0$ to $D_9$ for the tens;
-$C_0$ to $C_9$ for the hundreds.

It has been seen for example that the purpose of the two control units referred to was to treat external information following a cycle rhythmed by the ordinal counter. For that purpose, it must operate the calculating unit in such manner as to ensure this treatment in a logic order. The diagram of FIG. 3 shows what are meant by 31a, 32a, 3 13, 3 E3, 3ya, 35a, 3 E6, 3 E7, 3 16, 3 17, 3 E9, 3 19, 3 110, 3 111, 3 112, 3114, 3 E10, 3 E11, 3 E13, 3 E14, 3 E3.

The informations coming into action at the same calculation level are first of all grouped together:
31a and 32a at 312a;
34a and 35a at 345a;
3E6 and 3E7 at 3E67;
316 and 317 at 3167;
3110 and 3111 at 31101;
3E10 and 3E11 at 3E101.

There is therefore only left to control: 312a, 313, 345a, 3E67, 3167, 3E9, 319, 31101, 3E101, 3E13, 3113, 3E14, 3E3.

This method of construction results in the following advantages:
1. Certain controls may be carried out at the same time.
2. Certain circulation cycles take place several times in the same order and, in the case where the cycle is not fully completed, it is possible to complete it so as to make it identical with the others.

These arrangements do not affect the calculation in course, but simplify the design of the operating units.

There are therefore grouped together 3167, 345a, 3E3, this group being designated by 3167*, and subsequently 313, 312a, designated by 313*.

The pre-determned cycles are as follows:
3E67, 3167*, 3E9, 319, 3E101. 31101.

Only with the calculation units, the first control of each cycle is generated, the subsequent controls being de-phased by a clock impulse with respect to each other, this de-phasing being carried out electronically.

The operating unit-calculating unit connections are very simple and are automatically deduced from the detail of the calculating unit.

Each control unit, for example of the injection and ignition type, gives corresponding information to the same wires of the calculating unit. It is therefore necessary to join them together by means of an OR gate; it is for that purpose that the information has been complemented before the output of the operating units.

The principal technological characteristics of the computer forming the object of the invention and previously described, are completed by the particular features of the input and output devices which ensure its connection to the parts of the vehicle, and corrspond-ing functionally to the peripheral devices of a conventional computer.

These particular technical features which ensure effective communication between the computer and the vehicle, taking into account their respective characteristics, are essentially:
-Measurement of the speed;
-the conversion devices for the informatiion given by the temperature probes;
-measurement of the pressure;
-measurement of the temperatures.

The temperature-voltage conversion devices ensure the treatment of the temperature measurements (air, water, etc.) from thermistances of known type, either by means of a logarithmic amplifier permitting the conversion of a value of the resistance to a voltage proportional to the temperature or of a function generator, permitting the conversion of the value of the resistance to a voltage which is a nonlinear function of the temperature, for example in order to carry out specific corrections of richness on a given type of engine.

This amplifier is followed by an analogue-digital converter permitting the treatment of the corrections in a digital computer.

Analogue-digital converter which may be utilized is divided or real time.

A device is employed which operates, using the charge of a condenser by the voltage to be converted, the time of linear discharge enabling the impulses to be counted of a constant-frequency clock, proportional to the voltage to be measured.

Measurement of the speed

There is utilized the counting of the teeth of the starter toothed-ring in order to measure the speed, following the method forming the object of French Pat. No. 71/21,514 of June 14, 1971 and its Addition, in the name of the present Applicants. (U.S. Pat. app. No. 261,974 of June 12, 1972).

Temperature measurements

The temperature probes are thermistances, the resistance of which is of the form:

$$R = A e^{\frac{B}{T}}$$

where A and B are constants, and T is the absolute temperature.

This variable resistance must be converted to a voltage which is a linear function of the temperature. First of all, this resistance must be measured. It is supplied with a constant current and the voltage at its terminals is measured. This solution gives directly a voltage proportional to the resistance, and therefore to $eB/T$.

In order to obtain a voltage which is a linear function of the temperature, a logarithmic amplifier is used.

However, the input resistance of an amplifier of this kind being of the order of 10 kilo-ohms and the resistance of the probes reaches 20 kilo-ohms.

An impedance-matching device must be inserted as in the block diagram.

| Probe | Current generator | Impedance matching device | Logar-ithmic amplifier | Analogue digital con-verter |
|---|---|---|---|---|
| | | | | |

It may be observed that as the variation of temperature is slow, it is possible to use time constants in order to render the analogue unit more insensitive to external parasites.

In order to prevent overheating of the temperature probe, it is necessary that a too-high current should not be premitted to pass through it.

As this current should not vary with temperature, a transistor current generator cannot be suitable. On the other hand, the current must vary only slightly with the load resistance, which necessitates the use of a transistor with a field effect, having a low output admittance.

Figure 4:
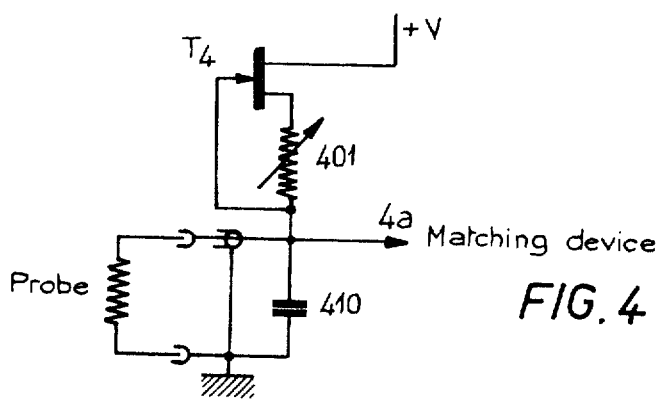
FIG. 4 shows the connection diagram of a temperature probe.

Following the diagram of FIG. 4, the resistance 401 fixes the current supplied by the transistor T4. The condenser 410, connected in parallel with the probe, renders the measurement insensitive to stray currents. The output signal 4a of the circuit of FIG. 4 is directly transmitted to the input 5a of the circuit pf FIG. 5.

Figure 5:
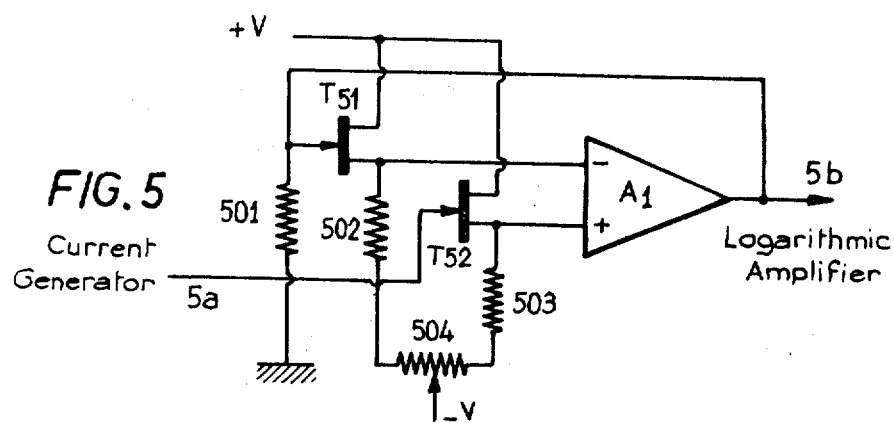
FIG. 5 shows the diagram of an impedance matching device preceding the logarithmic amplifier utilized with the said temperature probe.

An impedance-matching device is provided at the input of the logarithmic amplifier, according to the diagram of FIG. 5. In fact, the very low value of the current passing through the probe (of the order of 160 micro-amperes) does not enable the signal to be applied directly to a logarithmic amplifier.

An error of 1 percent is admissible due to the current shunted in the matching device. As the maximum resistance of the probe is 20 kilo-ohms, the imput impedance of the matching device must be greater than 20 kilo-ohms × 1,000 = 20 megohms.

In addition, its temperature drift must be very small as must also be the error of linearity.

These conditions lead to the use of two field effect transistors (FET) T 51 and T 52 (FIG. 5) in differential connection in order that the input resistance may be greater than 20 megohms. The second input of the differential circuit is used for the reverse reaction necessitated by the linearity. The adjustment of the unbalance is provided by means of the variable resistance 504.

Figure 6:
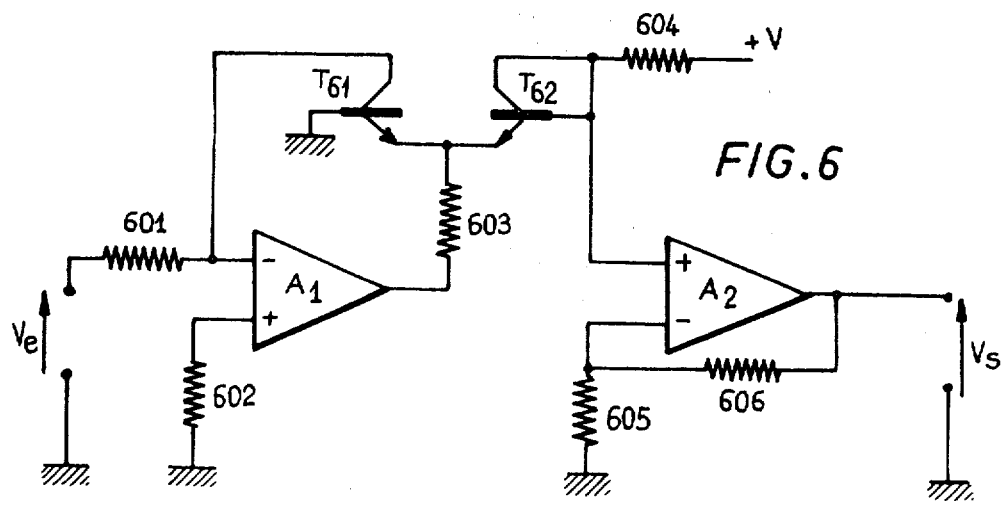
FIG. 6 represents the diagram of the said logarithmic amplifier.

The very low output resistance makes it possible to supply the logarithmic amplifier obtained according to the diagram of FIG. 6, the input resistance of which is of the order of 10 kilo-ohms.

The base of the transistor T61 being earthed as is also practically its collector, this transistor is not saturated. Its collector current thus amounts sybstantially to $V_e/R601$ and its base current $IB_1 = Ve/BR601$ is small. We then have $I_{B1} \approx I_0 e^{qV_{BE61}/kT}$
in which:
$I_0$ = reverse current
q = electron charge
K = Boltzmann constant
T = absolute temperature.

The references $R_{601}$ to $R_{606}$ refer to the values of the corresponding resistances (see FIG. 6).

$V_{BE61}$ and $V_{BE62}$ are respectively the voltages between the base and the emitter of the transistors $T_{61}$ and $T_{62}$.

Similarly, as the base and the collector of the transistor $T_{62}$ are at the same potential, the transistor $T_{62}$ is not saturated. Its current $I_{B2}$ has thus value of about $$\frac{Ve}{R604} \text{ and is very small.}$$

Thus: $I_{B2} \approx I_0 e^{\frac{qV_{BE62}}{KT}}$ $$V_{BE61} = \frac{KT}{q} \ln \frac{I_{B1}}{I_0} V_{BE62} = \frac{KT}{q} \ln \frac{I_{B2}}{I_0}$$

$$V_{B2} = \Delta V_{BE62} = B_{BE61} = \frac{KT}{q} \ln \frac{I_{B2}}{I_{B1}}$$

or $V_{B2} = \frac{KT}{q} \ln \frac{I_{B2}}{B_2} \cdot \frac{B_1}{I_{c1}} \approx \frac{KT}{q} \ln \frac{I_{c2}}{I_{c1}}$ In addition:

$$V_{B2} = \frac{R_{605} V_S}{R_{605} + R_{606}} I_{c1} = \frac{V_e}{R_{601}} I_{c2} = \frac{V}{R_{604}}$$

Therefore:

$$\frac{R_{605} V_S}{R_{605} + R_{606}} = \frac{KT}{q} \ln \frac{V R_{601}}{V_E R_{604}}$$

from which:

$$V_e = \frac{-R_{606} + R_{605}}{R_{605}} \cdot \frac{KT}{q} \cdot \ln \frac{R_{604}}{R_{601}} \cdot \frac{V_o}{V}$$

According to an alternative form, it would be possible to contemplate the elimination of the logarithmic amplifier by using platinum resistances having an almost linear law of variation with temperature, having the form:

$$R = Ro (1 + 39.6.10^{-4} t + 5.8.10^{-7} t^2)$$

where $t$ is a temperature comprised between 0 and 600°C.

THE ANALOGUE-DIGITAL CONVERSION

Figure 7:
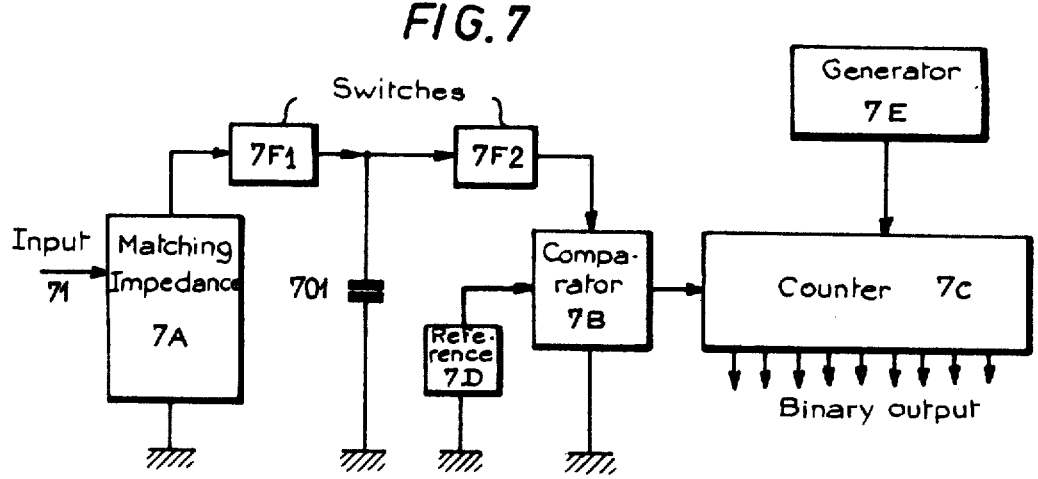
FIG. 7 shows the diagram of an analogue-numerical converter utilized for the conversion of data.

This operation is carried out by converters of the type of which the diagram is shown, by way of example in FIG. 7.

There are available at the outputs of the logarithmic amplifiers previously described, voltages having variations proportional to the variations of temperature registered by the corresponding detector. These temperature variations introduce multiplying coefficients K1 for air and K2 for water.

The function of the analogue-digital converters is to supply directly in their digital form the coefficients K1 and K2, each of these coefficients being prepared by its own converter. In fact, K1 is a function only of the air temperature while K2 is a function only of the water temperature.

The laws to be observed are as follows:

$$K1 = 1 - \frac{t}{500}, \text{ where } t \text{ is the air temperature in °C}.$$

$$K2 = 1 + \alpha \frac{T1 - T}{T1 - T_0}$$

where
T = water temperature
T1 = temperature of hot engine, + 80°C.
To = -30°C.
α = regulation parameter to be obtained by tests.

These two laws are decreasing linear functions of the temperature.

The computer only utilizes two kinds of numbers:
- Whole numbers,
- Decimal numbers.

It is therefore impossible to write K1 and K2 with one or the other of these two models, without risk of cutting-off either the whole part or the decimal part.

The solution chosen for translating them to binary writing consists of calculating:

LK1 = K1/2 and LK2 = K2/2

The numbers LK1 and LK2 are then comprised between 0.4 and 0.6, and it is possible to write them in decimal code.

The use of LK1 and LK2 presents no difficulty for the calculation of the injection time, which will be examined later, in which the expression of this time is of the form:

$$\tau = K1.K2 \ (ap + bp^3) = LK1.LK2 \ (ap + bp^3) \ .4$$

As regards the counting, the decimal numbers utilized by the computer are written in ten binary positions. In the following examples, we have:

| Number of the binary position | | | | | | | | | |
|---|---|---|---|---|---|---|---|---|---|
| 10 | 9 | 8 | 7 | 6 | 5 | 4 | 3 | 2 | 1 |
| Binary weight | | | | | | | | | |
| 512 | 256 | 128 | 64 | 32 | 16 | 8 | 4 | 2 | 1 |
| Decimal value | | | | | | | | | |
| 0.5 | 0.25 | 0.125 | 0.0625 | 0.03125 | 0.015625 | 0.00781 | 0.00390 | 0.00195 | 0.00097 |

From which the number of impulses are counted for LK1 and LK2 are:

| LK1 = | Decimal value | 1.06/2 | 0.88/2 |
|---|---|---|---|
| | Digital weight | 542 | 450 |
| | Air temperature | −30°C. | + 60°C. |
| LK2 = | Decimal value | 0.6 | 0.5 |
| | Digital weight | 614 | 512 |
| | Water temperature | −30°C. | + 60°C. |

In the whole sequence of the calculations, LK1 and LK2 are indicated by their values in weight, that is to say by the number of impulses counted.

At each half-revolution of the engine, a time of 4 ms is available for carrying out this counting.

During these 4 ms, the whole computer is at work.

If the time $t = 0$ is noted at the beginning of all the calculations, the use of the coefficients LK1 and LK2 is effected at the time $t = 130 \ \mu s$.

In order to avoid the use of memories, the calculation of the coefficients LK1 and LK2 will only begin at the time $t = 150 \ \mu s$ and will continue up to $t = 4$ ms.

In fact, any action on the content of the binary counters before the time $t = 150 \ \mu s$ makes it necessary to provide a memory.

It will be observed that in this example, the extreme values of LK1 and LK2 only differ by:
542 − 450 = 92 impulses for LK1, and
614 − 512 = 102 impulses for LK2.

The overall counting utilizes a large number of impulses, but the difference between the extremes remains small.

The foregoing remark results naturally in the following method, which divides the counting into two periods:

- First operation: Filling of the counters up to a fixed value
- Second operation: the counting is completed in such manner as to satisfy the stated laws of variations.

It is thus possible to explain the operation as follows (see FIG. 7):

The adapter 7A charges the capacity 701 to a voltage equal to that present at 71, by the action of the switches 7F1 and 7F2. The condenser 701 is discharged at constant current and during the discharge time the impulses coming from the generator 7E are counted. The charging time of 701 is utilized for filling the counters with the fixed number of impulses, as previously defined.

At the end of the discharge of 701, there is available at the output of the counter 7C the number which represents LK1 or LK2.

The two functions $\tau_1$ and $\tau_2$ are very close to each other.

The two analogue-digital converters will therefore be identical, but the logarithmic amplifiers will be set differently.

The number of impulses to be counted being small, the absolute error of the result is equal to the absolute error of the second period of counting.

Assuming an error of 1 percent on this second operation: or therefore 1 percent for a maximum of 134 impulses:

1 percent × 134 = 1.34 impules.

Now LK2 is then composed of 512 impulses, or a relative error on LK1 of $$\frac{1.34}{512} = 2.5 \ ^o/oo.$$

The resulting accuracy is therefore very interesting. The detection of the following faults:

- Abnormal voltage at the output of the logarithmic amplifier;
- Counting failure (the first counting must be completed before the beginning of the second).
- Overflowing of the counters (also known as overcharging of capacity) causes the appearance of a failure signal which is put into memory. The failure signal substitutes the value 0.5 for the result of the counting.

Therefore, in the case of detected failure, K1 = 0.5, or K2 = 0.5.

The failure signal is wiped-out at every beginning of a counting period. However, the frequency of appearance of the said failure signal permits its display outside the computer, on a light indicator for example.

Measurement of the pressure

The measurement of the pressure is made following the instantaneous method of measurement of mean pressure under pulsatory conditions which forms the object of French Patent Application No. 71/09.831 of March 19 1971 in the name of the present Applicants. (U.S. Pat. app. No. 233,629 of Mar. 10, 1972).

ANALOGUE-DIGITAL CONVERSION OF THE PRESSURE

In this particular case, the law to be followed results in obtaining a numerical result proportional to the voltage applied to the system, this input voltage being itself proportional to the absolute pressure of air admitted to the admission pipes.

An integrator with a double slope is employed.

The operation is effected in three periods:

First period

The signal to be converted is integrated for two milliseconds. If the output voltage of the integrator is kept at zero volt up to the beginning of this first period, this voltage is then at the end of this period equal to:

$U_2 = -\alpha(V_e)$ in which $\alpha$ is a constant and $V_e$ is the voltage to be converted.

Second period

A negative constant is then integrated. During this operation $dU_2/dt = $ an adjustable constant $= \beta$ from which the output voltage of the integrator $Us = -U_2 + \beta t$.

This second operation is stopped when $U_s = 0$, from which $$\alpha V_e = \beta t$$

$$t = \frac{\alpha}{\beta} V_e$$

The duration t of this second operation is thus proportional to the voltage $V_e$ integrated during the first period.

It is during this time t that the counting is carried out.

Third period

The system is locked until a new counting order is given.

The setting of the counters to zero is effected at the time $t = 2$ ms. In fact, the utilization of the contents of the counters is effected between the time $t = 0$ and the time $t = 300$ microseconds.

For tracing faults, there is available:
- A voltage proportional to the pressure and prepared from the pressure detector. This voltage is applied to the socalled normal input;
- and a voltage giving an image of the pressure. This voltage given by a rheostat controlled by the accelerator pedal is applied to the so-called emergency input.

The normal input signal must be comprised between 1 and 10 volts. If this condition is not observed, the conversion system is automatically switched over to the emergency input, and the counting is carried out in the same manner as if there had been no failure.

After having seen the structure of the computer and its constituent elements, there will be described below the constitution of the connections of this computer with the most important member of the vehicle as regards this control by ordinator, namely the engine which, in the example described, is of the type with injection and controlled ignition.

COMPUTER-ENGINE CONNECTIONS

These connections include:
- The conversion of the injection time indicated numerically at the output of the memories of the result of the calculation unit, to a signal compatible with the injectors, and the distribution of these signals over the various injectors;
- The calculation of the ignition angle and the production of the ignition control impulse. The distribution of the ignition is effected in a conventional manner.

CALCULATION CIRCUITS OF THE INJECTION TIME

The injection time is supplied by the computer in the form of a binary number expressing the injection time in $10^{-5}$ seconds. The conversion of this number to real injection time is effected by means of a calculation circuit working at frequency of 100 KHz (general clock divided by 10). The calculated time is then equal to the real injection time. This arrangement multiplies the calculation accuracy by 10 and partly compensates for the variations in clock frequency, especially with variations of temperature.

The system must also provide the distribution of the injection order successively on the four cylinders. The possible overlap of the injection on two consecutive cylinders has led to the adoption of a pair of calculating devices utilized alternately.

Figure 9:
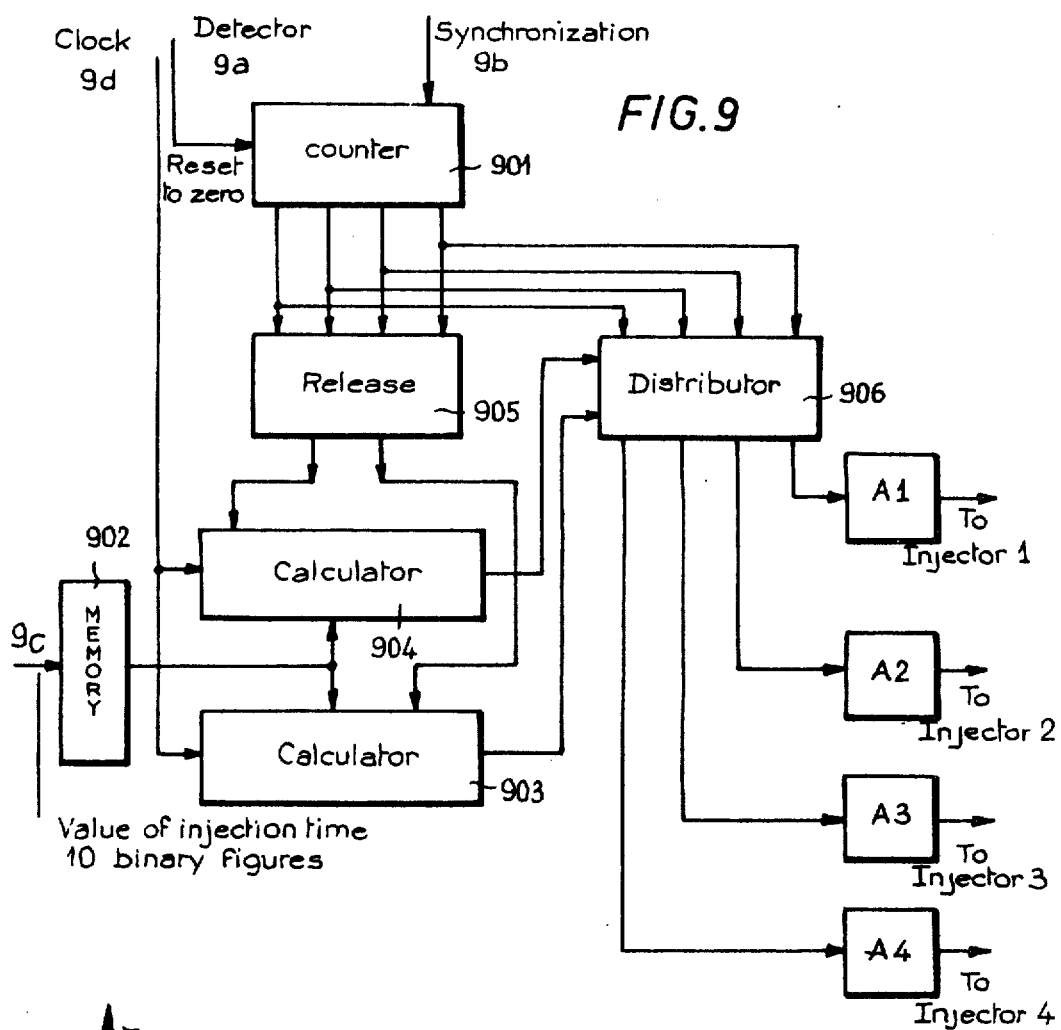
FIG. 9 shows the diagram of the control circuits of the unit controlling the injection of the vehicle engine.

The setting of the distribution is ensured by a detection device known as a "corrector" shown at 9a in FIG. 9, located on the cam-shaft and coming into action every two revolutions of the crank-shaft.

The input and output signals of the injection unit are ensured for the inputs (see FIG. 9) by:
- 10 figures corresponding to the number calculated by the calculation unit 9c;
- 1 synchronizing figure coming from the half-revolution detector, in phase with an impulse from the clock 9b;
- 1 Clock 9d;
- 1 figure of the zero re-setting of the distributor coming from the corrector and located inside the time interval separating two half-revolution consecutive synchronizing impulses 9a, and for the outputs by 4 signals corresponding to the 4 injectors and having a duration equal to the real injection time.

The operation of the whole unit is effected as follows:

The counter 901 re-set to zero by the impulse from the corrector 9a once every two revolutions of the crankshaft, increments the distributor 906 and the release device 905 every half-revolution of the engine.

The release 905 selects the calculator to be put into service, taking account of the fact that the injection time may be longer than the time taken by the engine to make half a revolution (the time which separates two synchronizing impules 9b).

The distributor 906 directs to the amplifier $A_i$ (corresponding to the injector $I_i$ to be put into service) the signal delivered by the calculating device previously selected by the release device. The injection order into the cylinders can thus be followed.

CIRCUITS FOR CALCULATING THE IGNITION ADVANCE

The ignition advance is supplied by the computer in the form of a binary number expressing in microseconds the time which is to elapse between one synchronizing impulse (half a turn) and the next ignition.

The distribution is carried out mechanically, independently of the system (high-tension).

The time to be found being calculated with a certain tolerance and half a turn before use, it is possible for very small amounts of advance that the calculation errors and the variations in the real speed of the vehicle result in a calculation giving a negative advance (retard).

In this case, the system should effect the ignition with a zero advance; there should not in any case be a negative advance.

In the case where the speed of the vehicle is less than 294 r.p.m., a special signal is prepared by the computer, the purpose of which is to produce ignition with zero advance irrespective of the value of the time to be calculated, displayed at that moment by the computer.

Figure 8:
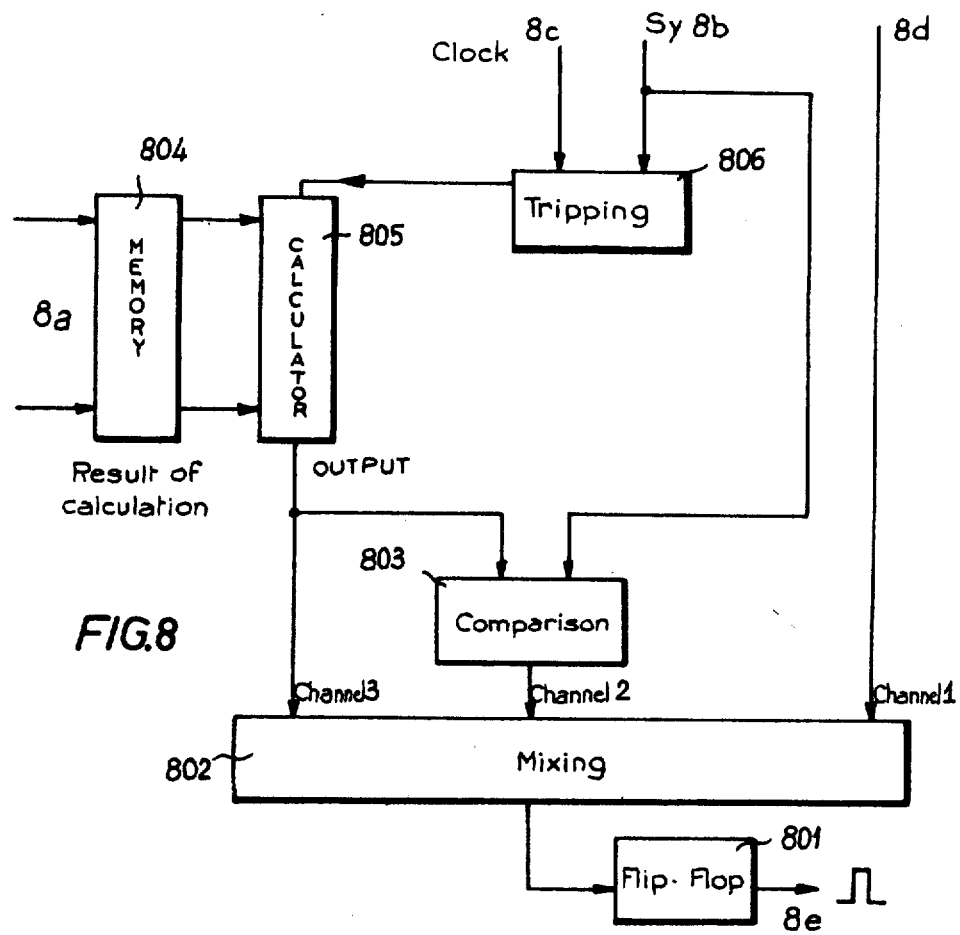
FIG. 8 shows the diagram of the inlets and outlets of the control unit for regulating the ignition of the vehicle engine.

The input and output signals of the advance unit are effected for the inputs (see FIG. 8) by:
- 20 figures corresponding to the calculated number 8a;
- 1 synchronizing FIG. 8b;
- 1 clock (1 MHz) 8c;
- 1 zero advance figure 8d;

and for the outputs by:
- 1 figure corresponding to the ignition instant 8e (rising front).

The duration of this information may be regulated to any value in order to ensure correct release of the electronic ignition system employed, by the multivibrator 801.

For the operation of the ignition control system, the diagram of FIG. 8 corresponds to the diagram of the work cycle (per half-revolution of the crank-shaft).

The time calculated between the synchronizing impulse and the ignition instant corresponds to the angle of rotation $\alpha$ of the crank-shaft, as previously seen.

During the course of operation of the computer, the arrival of a synchronizing impulse at 8b causes, through the release device 806:

a. If the "zero retard" signal exists, an immediate ignition (channel 1);

b. if the signal "zero retard" does not exist, and if the calculation is not completed, an immediate ignition takes place over channel 2, by means of the comparator 803;

c. apart from these two cases specified above, the loading into the calculator 805 of the last number prepared by the computer and contained in the memory 804, followed by the release of the calculation. The output of the calculator then trips the multivibrator 801 over channel 3.

The output of the multivibrator trips the ignition device, the memory 804 is wiped-out and again recorded, always outside the loading period of the calculator and always once per half-turn.

The injection and ignition controls are therefore conditioned by the times prepared by the calculator. The theoretical method of calculation is described below.

CALCULATION OF THE INJECTION TIME

The injection time $\tau$ must be calculated as a function of the parameters available, namely:
- P: pressure in the admission manifold;
- $\omega$: speed of rotation of the engine;
- T: the temperatures, which are only active as correction factors.

Within the scope of the example of construction of the invention, there is available a system of curves $\tau = f(\omega)$ with $p$ as a parameter, and for different values of the percentage of CO in the exhaust gases.

On the other hand, several supplementary data are to be observed:

a. The content of CO in the exhaust gases must be less than 0.5 percent in the case of $P < 600$ torr.

Above this pressure, that is to say on high load, this content may reach 4 percent;

b. for low speeds, lower than or equal to the idling speed, it is necessary to increase by a constant value of 0.7 ms, which corresponds to a proportion of 2 percent of CO in the gases.

It is thus necessary to produce a system of operating curves, the mathematical expressions of which are simple and which comply with the conditions laid down.

The conversion of this system of curves is carried out by knowing that the filling rate of the cylinders is a linear function of the pressure in the admission manifold, and that the constant flow injectors on the one hand and on the other hand the internal re-circulation of the burnt gases due to the delay in closing the exhaust valve are variable with the speed and the load on the engine, introducing, due to their response time, a corrective term of the third degree at p. There is thus employed an equation having the form:

$$\tau = ap + bp^3$$

where $a$ and $b$ are coefficients which contain the other parameters.

The temperatures may be introduced by means of the multiplying coefficients K1 and K2 previously indicated. It should be observed that a term of the form $ap^2$ would provide nothing in the way of regulation. Thus, it is eliminated in order to simplify the calculation unit of the computer.

The operation is thus carried out at constant temperature for this part of the calculation.

There thus remains for a and b only one parameter: the speed.

In this case where a and b are a function solely of the speed and where the choice has been made on a digital calculator $\tau$ more accurate than the analogue computer, the determination of $a$ and $b$ remains to be effected.

To this end, the putting into memory of a and b will advantageously be carried out for different values of the speed.

Bench tests have shown that at constant pressure, a variation of speed of less than 100 r.p.m. introduces a very small variation of: $\tau$ The final solution is therefore a calculation of $\tau = ap + bp^3$ with putting into memory of a and b for speeds in steps of 100 r.p.m. As a function of the initial system of operating curves of the engine, there is obtained for each value of p and $\omega$, two values of:

$\tau_M$ corresponding to 0.5 percent of CO;

$\tau_m$ corresponding to instability due to defect of richness.

It is thus possible to draw, for each value of $\omega$, a curve $\tau_M = f(P)$ and a curve $\tau_m = f(P)$.

The desired characteristic curve must be situated between these two limits. A corresponding curve can be determined for each value of $\omega$.

CALCULATION OF a AND b.

A - General case

Figure 10:
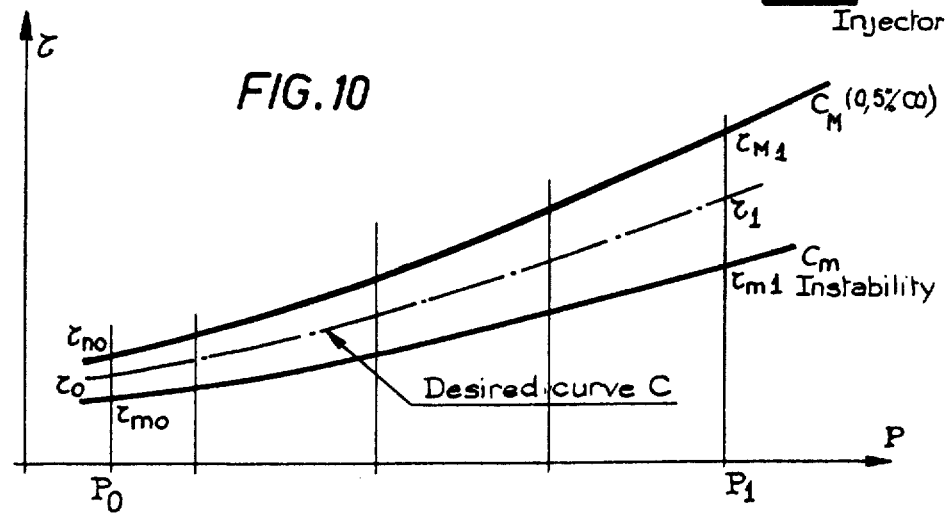
FIG. 10 shows an example of an operating curve of the engine for a given speed (injection time as a function of the admission pressure)

There will be examined a pair of curves corresponding to a speed (according to the example of FIG. 10).

The desired curve C being defined by two parameters, two points will determine it completely.

The curves $C_M$ and $C_m$ are already known by five of their points.

If $P_0$ and $P_1$ are the extreme values of P, for each of these values there may be determined a point $\tau$, which is the centre of the segment $\tau_M$ $\tau_m$. Through these two points, there passes only one cubic curve C, the determination of which is effected, for each value of $\omega$, by means of the following system:

$$\tau_1 = \frac{\tau M1 + \tau m1}{2} \quad \tau_0 = \frac{\tau M_0 + \tau m0}{2}$$

$$\tau_1 = aP_1 + bP_1^2$$
$$\tau_0 = aP_0 + bP_0^3$$

from which it is easy to deduce a and b.

This cubic curve, in theory the best placed, will serve as the starting point for a possible modification of the coefficients which will be effected in accordance with two criteria:
1. Checking that C is truly located between the given limits $C_m$ and $C_M$.
2. Modification of these coefficients in order to be able to keep a constant value between $\omega$ and $\omega +$ 100 r.p.m. and if possible over a larger range of speeds.

B - Values for $\omega <$ 1250 r.p.m.

The principle of calculation is identically the same. The reference curves will be taken as follows:
- For $1100 < \omega < 1250$ r.p.m.: curves corresponding to 1250 r.p.m.
- For $\omega < 1100$ r.p.m.: the same curves increased by 0.7 ms C - The case of the idling speed The injection time for idling speed must be fixed independently of this calculation, for two reasons:
a. The idling speed must be stable, which is incompatible with a calculation of $\tau$ as a function of this speed.
b. It must be adjusted on the assembly line for each engine, since it is a function of the mechanical efficiency of the engine.

D - The case of P > 600 torr

The operation at full load is effected at 4 percent of CO. The corresponding curve is known, $\tau = f(\omega)$. The transition from 600 torr (0.5% CO) to full load will be effected linearly following the tangential extension of the preceding cubic curve from the point corresponding to $P = 600$ torr.

The equation of the straight line will be:
$\tau = b' + (P - 600)s'$. Two points corresponding respectively tp $P = 600$ torr and $P = 760$ torr will determine it entirely.

F - Case where $\omega < 1100$ r.p.m. and $P = 600$ torr

The method of determining the straight line is identically the same as in the previous cases.

There is taken at 600 torr the value of the injection time for 0.5% CO, increased by 0.7 ms, and at 760 torr the value corresponding to 4% CO and 1250 r.p.m.

FORM OF NUMBERS TO BE INTRODUCED INTO THE COMPUTER

In order to remain during the whole calculation in a fractional convention, the form of the relations must be modified.

A - For $p > 600$ torr

The injection time $\tau$ is comprised between 2 and 8 ms. In order to be able to express this in fractional convention and fixed comma, $(a_1 2^{-1} + a_2 2^{-2} + \ldots + a_n 2^{-n})$ it is necessary to calculate $0.1\ \tau$, a number which will be comprised between 0.2 and 0.8.

In the expression $ap + bp^3$, this makes it necessary to multiply each term by 0.1.
a. $ap$ : a is comprised between 0.6 and 0.8 which is suitable. $p$ is comprised between 0 and 8, and must therefore be multiplied by 0.1.
b. $bp^3$: $p$ is multiplied by 0.1, it is therefore necessary that $$0.1\ bp^3 = [xb] \cdot [0.1 \times p]^3$$

therefore $x = 100$.

As $b$ is comprised between 0 and $4.10^{-3}$, 100 $b$ is comprised between 0 and 0.4, which is also suitable. The relation thus becomes:

$$0.1\ \tau = a \times [0.1\ p] + [100b][0.1p]^3$$

The calculation will therefore give $0.1\ \tau$. The coefficients are recorded in the memory in the form:

| a | 100 b |
|---|---|

The relation associating the accuracy with the number of bits gives:

| | | | |
|---|---|---|---|
| $d\tau$ | $= 0.005 \rightarrow d\ (0.1\ \tau)$ | $= 0.0005 \rightarrow n$ | $= 10$ bits |
| $da$ | $= 0.002$ | $\rightarrow n$ | $= 8$ bits |
| $db$ | $= 0.4.10 \rightarrow d\ (100b)$ | $= 0.004 \rightarrow n$ | $= 8$ bits |
| $dp$ | $= 0.01 \rightarrow d\ (0.1p)$ | $= 0.001 \rightarrow n$ | $= 10$ bits |

B - For $p > 600$ torr

The conditions required being less strict, the number of bits may remain the same.

The same method of conversion is applied as indicated above.

In addition, as $a'$ is greater than 1, it is decomposed so as to remain in fractional convention and fixed comma.

The relation becomes:
$$0.1\ \tau = [0.1\ b'] + [0.1p - 0.6][a' - 1] + [0.1\ p - 0.6]$$

In the memory, the numbers will be introduced in the form:

| $a' - 1$ | $0.1b'$ |
|---|---|

If an approximate value is calculated for the accuracy obtained in the case considered above, there is obtained:

$$d\tau = adp + bp^2 dp$$

$$d\tau = 0.7 \times 0.1 + 3 \times 49 \times 0.01 \times 4.10^{-3}$$

$$d\tau = 0.007 + 0.006 = 0.013\ ms$$

This accuracy is amply sufficient in view of the greater difference between $\tau_m$ and $\tau_M$ found for $P > 600$ torr.

The relative accuracy is now evaluated: $\tau = 0.7 \times 7 + 4.10^{-3} \times 343 = 6.27\ ms$ Therefore, $\dfrac{d\tau}{\tau} = \dfrac{0.013}{6.27} = 0.002$ and $\dfrac{d\tau}{\tau} = 0.2\%$.

In conclusion, the memory will be divided-up into words of 8 bits and the calculation will be carried out with 10 bits.

The addressing of the dead memory is carried out at the speed $\omega$ in revolutions per minute. There must therefore be available an information representing $\omega/100$ The measurement of $\omega$ is made by counting during a time $t'$ the number of teeth of the starter crown-wheel which pass in front of a proximity detector.

The number n of impulses collected will be, if for example the crown-wheel comprises 139 teeth:

$$n = \frac{\omega \times t' \times 139}{60}$$

As it is necessary for $\omega = 100$ to have $n = 1$, we have:

$$t' = \frac{60}{100 \times 1 \times 139} = 0.004316 \text{ sec.}$$

The number of teeth is counted for 4.316 ms. The number n thus represents $\omega/100$ to within 1 percent, which is acceptable.

By causing the starting of the counting of the 4.316 ms to coincide with the passage of a tooth (which will not be counted) the correspondence between n and $\omega$ is such that we have: $100 n \leq \omega < 100(n + 1)$ r.p.m., for example, if $n = 10$, $1000 \leq \omega \leq 1100$.

DETERMINATION OF THE IGNITION ADVANCE

The angle of advance of the ignition must be determined as a function of the parameters which are available
- $P$: pressure in the admission manifold;
- $\omega$: Speed of rotation of the engine;
- $T$: Temperature of the cooling water.

The angle calculated in this first portion is the corresponding angle at the ignition device (half the number of degrees of rotation of the crank-shaft). Curves are available representing $\alpha = f(P)$ at various speeds.

For $\omega < 300$ r.p.m., the advance is zero, irrespective of the pressure.

The junction points of the various calculations will be determined by taking, as for the injection, a relation connecting $\alpha$ and $p$, and the coefficients of which are determined as a function of $\omega$.

It appears that:
1. 3 calculation zones are necessary in the pollution zone:
  a. $p < 500$ torr,
  b. $500 < p < 600$ torr,
  c. $p > 600$ torr;
2. For $p < 500$ torr and for $\omega < 1000$ r.p.m., the advance must be fixed at 0. 3 For $p > 700$ torr, the advance has a fixed value.

There is thus obtained a system of straight lines defined by 4 coefficients.

These coefficients are defined for the same values of as those of the injection calculation.

The previously calculated angle $\alpha$ is a number of degrees of rotation of the ignition device.

It corresponds to 2 $\alpha°$ of rotation of the crank-shaft between the ignition point and the top dead centre.

It is the time t which passes between the marking of a half-revolution impulse at the bottom dead centre and the ignition point which represents $\alpha$.

This time is inversely proportional to the speed. It is therefore necessary to determine $1/\omega$, in order to avoid a division.

Measurement of $1/\omega$.

By counting the impulses of a clock of frequency F during half a turn of the crank-shaft, there is obtained a number:

$$\Omega = \frac{3 \times 100 \times F}{10 \omega} \text{ with } F \text{ in Hertz and } \omega \text{ in r.p.m.}$$

If the frequency F of the rhythm clock is divided by 100, we have:

$$\Omega = \frac{3 \times F}{10 \omega} \qquad (1)$$

Representation of t

The clock impulses must be counted during this time. This necessitates the calculation of the number n of impulses corresponding to t. We have:

$$t = \frac{2 \alpha'}{\omega} \text{ where } \alpha' = \left| \frac{\pi}{2} - \alpha \right| \text{ in radians/sec.}$$

or: $\quad t = \frac{1 \alpha'}{3 \omega}$ and $\omega$ in r.p.m.

This time corresponds to:

$$N = \frac{F \times \alpha'}{3 \omega}$$

where $F$ is the frequency of the rhythm clock. Replacing $\omega$ by its value taken from (1), we have:

$$N = \frac{2}{3} \times \frac{\alpha' \times 10 \times \Omega \times F}{3 \times F} \quad N = \frac{10}{9} \alpha' \Omega \qquad (2)$$

It is interesting to find that this number is independent of F.

In order to make all the calculations in full convention for passage in binary, there must be written:
$[10 \alpha] = [10 \alpha] \neq [100 \beta] [0.1p - 0.1P_0]$.

The number $\Omega$ must be limited to 10 bits so as to be able to use the same computer as for the injection.

Thus, as the complete maximum of 10 bits is 1023; we have:

$$\omega > \frac{3 \times 10^6}{10 \times 1023} \rightarrow \omega > 294 \text{ r.p.m.}$$

In the flow-chart, accound must be taken of this condition. The formula (2) results in:

$$N = \frac{10 \alpha' \Omega}{9}$$

It will be recalled that:
- $N$ is the number of impulses representing the ignition advance $\alpha' = \pi/2 - \alpha$, in which $\alpha$ is the angle of advance in setting degrees of the ignition device.
- $\Omega$ is a number proportional to $1/\omega$, in which $\omega$ is the speed of rotation of the engine.

The correction for temperature is in this case fairly simple. There must be added for example 4° of the ignition advance setting if the water temperature is less than 10°C. This arrangement makes it possible to simplify the calculation of the advance at low temperatures, but if this were necessary, corrections of temperature having a more complex expression could be made. This would only complicate the calculation programme, without modification of the calculation unit or of the access.

In order to ensure the necessary correction from the moment when the re-starting of the injection takes place, the advance must be annulled and it will then be given progressively (in a time T which varies from 0.5 to 2 seconds) the normally calculated value.

In order to effect this, there must be removed from the calculated advance a term which is: - equal to this latter if t, the time elapsed since the restarting of the injector, is zero. - zero if the time elapsed is equal to or greater than T.

The method utilized is as follows:

We have $\alpha_c = \alpha - \alpha(100-q)/100$ where $\alpha_c = \alpha$ after correction, and $q = t/T \times 100$. This factor represents the ratio between the time elapsed from the zero setting signal to the moment when the calculation is effected.

It will be obtained in practice by counting the impulses supplied by the clock ($f = 1$ MHz) divided by a number equal to ($T \times 10^4$) where T is in seconds. As soon as $q = 100$, the counter becomes blocked and remains at 100 until the next annulation signal.

In this way, when t is greater than T, the corrective term is zero. T must be adjustable between 0.5 and 2 seconds, in steps of 0.5 sec. for example.

Figure 13:
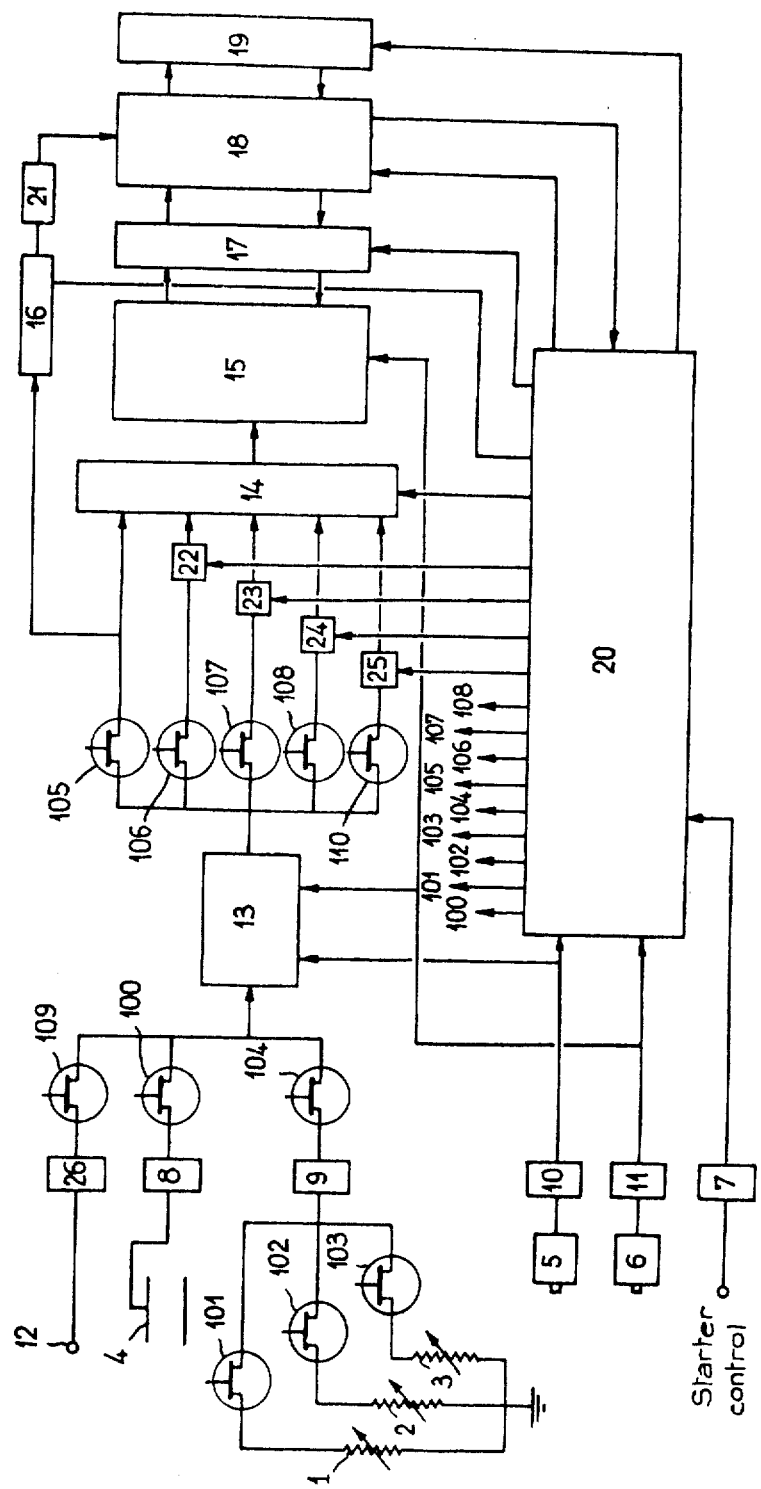
FIG. 13 is a synoptic diagram of another form of construction of a computer according to the invention.

In FIG. 13, the programme unit 20 controls and synchronizes the measurements and the calculation from the said measurements following the process described below:

The synchronizing detector 6 delivers an impulse I at the passage of the top dead centre and/or of the bottom dead centre. This impulse I is shaped in a circuit 11 which may be for example a multivibrator of conventional type. The impulse I then releases an ordinal counter incorporated in the programme unit 20, and which has the function of delivering the following measurement and calculation instructions:

At the half-turn of the crank-shaft preceding the release of the impulse I, the calculation unit 18 has carried out the measurement of the mass-flow into the detector 4, the information coming from 4 being treated in the interface 8 rendering the supply voltages from 8 compatible with the input voltages of the computer. The measurement of the flowrate is effected by sampling, the samples being synchronous with the position of the teeth of the starter crown-wheel (position prepared by the detector 5 supplying shaping impulses to the circuit 10 similar to the circuit 11). These impulses control the field effect transistor 100, permitting the passage of the information into the analogue-digital converter 13, the field-effect transistor 105 permitting the totalization in 16 of the impulses restored to the output of the converter 13.

The impulse I blocks the transistors 100 and 105 for a very short time, preventing any transfer of information, and releases the transfer of the contents of the totalizator 16, into a buffer memory 21, in which the flow information is stored while awaiting treatment in the calculation unit 18.

On the other hand, during the said previous halfturn of the crank-shaft between the flow-measuring samples, there are successively interposed the temperature measurements effected by the temperature probes 1, 2 and 3 and the measurement of the voltage of the battery 12, from which the stray currents are filtered in the circuit 26, while controlling successively so as to render them conductive, the transistors 101, 102 and 103, at the same time as the transistor 104, so that there are simultaneously conducting:
- The transistor 101 and the transistor 104, or
- the transistor 102 and the transistor 104, or
- the transistor 103 and the transistor 104, or
- the transistor 109. (The "or" is mutually exclusive).

The informations delivered from the temperature detectors 1, 2 and 3 pass into an anti-stray circuit 9 before being converted by the analogue-digital converter 13. The result is temporarily retained by the buffer registers 22, 23 and 24 by effecting the simultaneous control of the transistors:

104 and 106, or 104 and 107, or 104 and 108, or 104 and 110. (The "or" being mutually exclusive).

The foregoing description shows that the analoguedigital converter 13 is utilized in real and divided time.

Any fresh information which is presented at the input of the buffer registers 21, 22, 23, 24 and 25 releases a zero re-setting device of the said buffer registers, solely outside the calculation phase of 18.

The buffer registers 22, 23, 24 and 25, containing the information relating to the mass flow measured by the detector 4 and to the various temperatures (water, air, oil) measured by the probes 1, 2 and 3, control the addressing matrix 14 of the permanent memory 15 in which are selected the calculation coefficients previously referred to. These coefficients are furthermore only required for the needs of the calculation and only at the moment when they are necessary for effecting the said calculation (the response time of the circuits of the permanent memory being only a few multiples of 10 nanoseconds) the buffer register 17 enabling the various coefficients to be retained until they are taken into account for the calculation.

The buffer register 19 permits the counting on the one hand of the value of the injection time on the order of the synchronization impulse I, and on the other hand the value of the ignition advance expressed as the number of teeth of the starter crown-wheel. The counting is therefore carried out from signals issued from the shaping unit 10.

The parameters of the computer to be taken into account are therefore: the flow-rate of air, the measurement of which is obtained either by means of an electric measuring device or by means of a shutter measuring device of the BOSCH type, the flow information will be designated as Q; the speed $\omega$ of the engine (measured in the manner described in French Patent No. 71/21,514) (U.S. Pat. appl. No. 261.974 of June 6, 1972). The temperature of the engine, (water, oil or cylinder-head for example) measured by means of a thermistance with a negative temperature coefficient for example; this temperature will be noted as T. Amongst the information necessary for the computer, there must also be cited the "starter excited" information and the information on the temperature of suction air. Finally, the computer utilizes a method of synchronization similar to that described in the Patent of Addition 72/06538 to the above-mentioned Patent (U.S. above pat.)

$\Delta t$ is the time interval which separates two synchronizing impulses.

Figure 14:
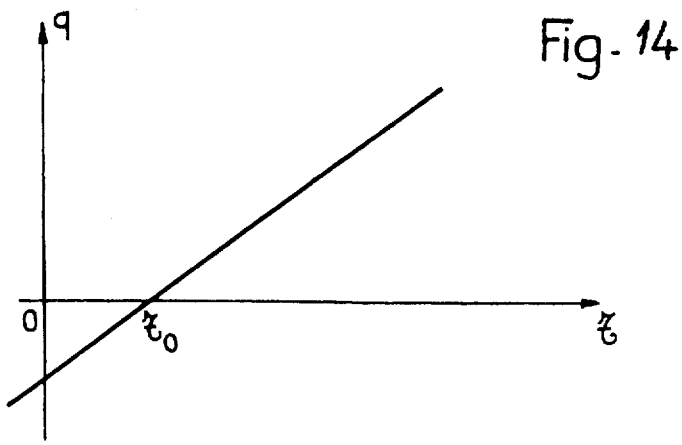
FIGS. 14 to 19 are curves showing the input functions of this computer.
Figure 15:
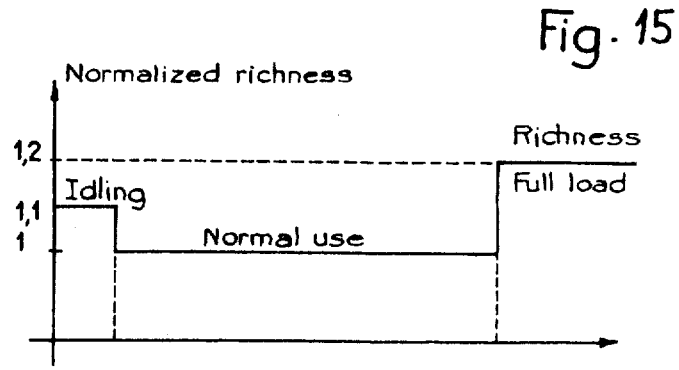

The input functions of the computer are shown in FIGS. 14 to 19. FIG. 14 shows the response $q$ of known electromagnetic injectors as a function of the injection time $\tau$. q represents the volume of carburetted mixture delivered at each injection operation.

We have $q = a(\tau - \tau_o)$
in which: $\tau = \tau_o + kq$ $k$ and $a$ being less than 0, $\tau > \tau_o$ In FIG. 15 there is given by way of example a functional distribution diagram of the richness at idling speed, during normal utilization of the vehicle and on full load.

Figure 16:
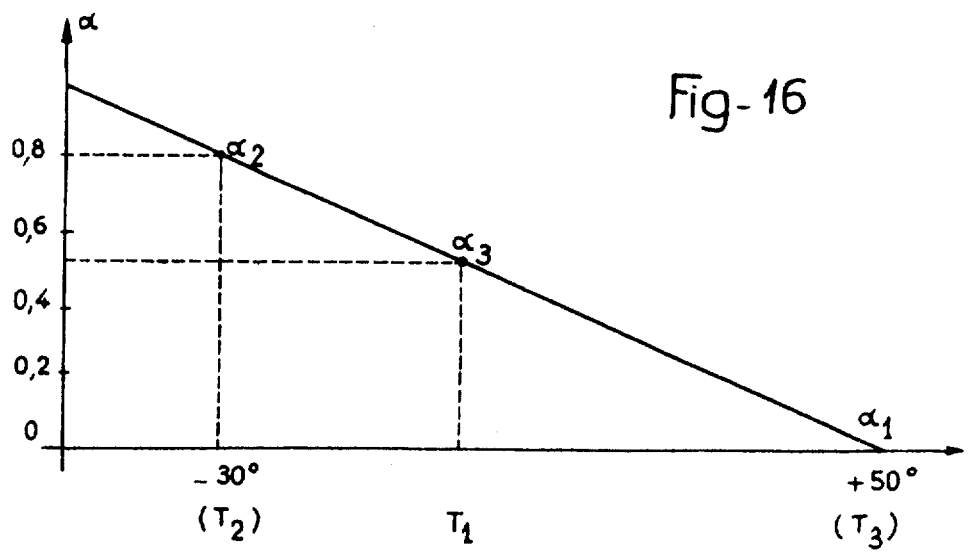

In FIG. 16 is shown the richness myltiplication factor $\alpha$ as a function of the temperature T (correction of the engine temperature T - function "Starter").

The richness correction $C_1(T)$ is mathematically formulated in the following manner:

If $T<T_3$, $C_1(T) = 1 + \dfrac{\alpha 3 - \alpha 2}{T_3 - T_2} T + \dfrac{\alpha 2 T3 - \alpha 3 T2}{T_3 - T_2}$ if $T>T_3$, $C_1(T) = 1 + \dfrac{\alpha 1 - \alpha 3}{T_1 - T_3} T + \dfrac{\alpha 3 T1 - \alpha 1 T3}{T_1 - T_3}$ where $T_1$, $T_2$, $T_3$, $\alpha 1$, $\alpha 2$, $\alpha 3$, being values specified by the manufacturer, $\alpha 1$ being generally taken as 0.

The foregoing functions are only given by way of indication and may be modified if so required.

The two equations given above are shown in relative correction. The term 1 can be eliminated in the case of absolute corrections, taking suitable values of $\alpha 1$, $\alpha 2$, $\alpha 3$.

Figure 17:
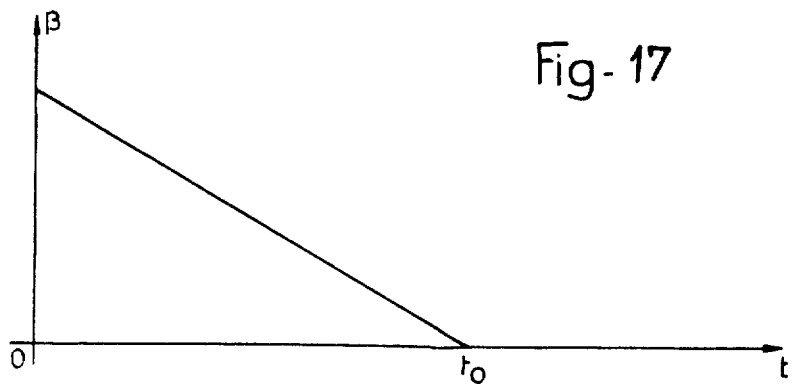

In FIG. 17 is shown the function of enrichment correction after starting-up. This correction is necessary in order to compensate for the absence of vaporization of the fuel in the cylinders due to the too-low temperature which exists there at the time of starting. The factor of multiplication of the richness as a function of the time is plotted in ordinates against the time in abscissae.

Figure 18:
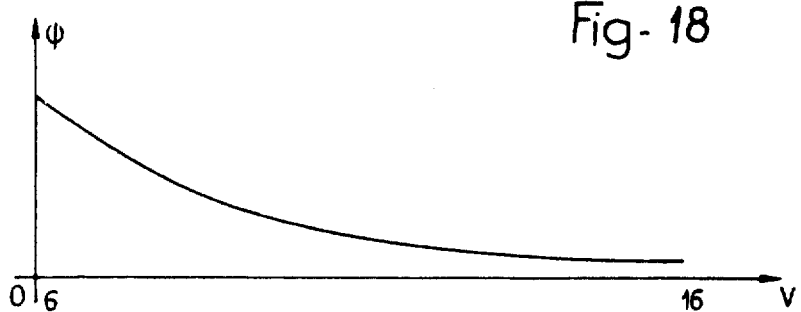
Figure 19:
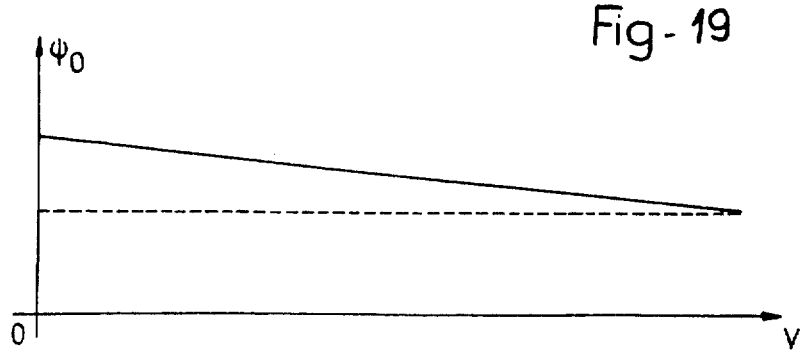

This function is written:

$$M = 1 + \beta(t_o - t) \text{ in relative correction;}$$

or $M = \beta'(t_o - t)$ in absolute correction,
where $\beta$ is of the form: $\beta_o(T_1 - T'_1)$
in which: $T'_1 < T_1$ FIGS. 18 and 19 represent respectively the correction function of the battery voltage in the two following cases:
 - Function $\psi = f(v)$ in the case of control of the injectors by non-regulated voltage;
 - Function $\psi_o = f(v)$ in the case of control of the injectors with current regulation. The function $\psi_o$ is of a homographic nature.

Another input function is the correction of air temperature in the case of the measurement of mass-flow:

$$C_2(T_a) = 1 + \dfrac{\alpha'2 - \alpha'1}{T_2 - T_1} T + \dfrac{\alpha'1 T2 - \alpha'2 T1}{T_2 - T_1}$$

Another input function of the computer is the correction of the normalized filling coefficient. The function is defined:

$$\theta(\omega) = \dfrac{R}{R(\omega)}$$

in which $R$ is the measured real filling and $R(\omega)$ is the maximum possible filling for the load, the temperature and the barometric pressure at their highest values.

The output functions of the computer are the injection time and the determination of the ignition point.

The injection time restored at the injector is evaluated in the following manner:

$$\tau = C_2(T_a).M.C_1(T)(\tau + k R) + \psi_o$$

in which $R$ is the real filling of the cylinder with air.
The ignition point is calculated in the following manner.

$$A = a(\omega)\,\theta(\omega) + b(\omega) + A(T)$$

in which $A(T)$ is a constant specified by the manufacturer if T remains below a given temperature. $\theta(\omega)$ is a function directly proportional to the absolute pressure in the admission manifold, and further permits the easy generation of the enrichments of full load.

As regards the method of obtaining the information, the measurement of the filling $R$ from the flow-rate $Q$, where $R = kQ/\omega$, k being a constant, is obtained by carrying out the division $Q/\omega$ by integrating the flow-rate function $Q(\omega)$ between two synchronizing impulses. The result of this integration is directly proportional to $R$.

The temperature is converted to a linear function by means of a non-linear sensing device. A measurement of the resistance of the thermistance is carried out, and a value proportional to this resistance is generated, and the permanent memory of temperature programmed in the reverse function of the characteristic of the resistance function of the temperature is addressed. The value of the coefficient is directly programmed in the memory.

As regards the method of measurement of the battery voltage, the real voltage of the battery is converted to a proportional number by means of the analogue-digital converter, and the permanent memory programmed in injection times is addressed.

What we claim is:
1. An analog-digital-analog control system for controlling control devices on an engine, comprising: detecting means coupled to said engine for detecting engine performance data of more than one type;
analog-to-digital conversion means coupled to said detecting means for converting analog signals representing detected engine performance data into corresponding digital signals;
read-only memory means for storing predetermined reference data relating to said detected data;
calculating means coupled to said analog-to-digital conversion means and to said read-only memory means for calculating engine control signals from said reference and detected data;
multiplexing means coupled to said analog-to-digital conversion means and said calculating means for selecting one type of engine performance data from among said more than one type for calculation in said calculating means;
clock means for generating a plurality of clock pulses;
synchronizing means coupled to said clock means and to said engine for synchronizing the output of said clock means with the rotational speed of said engine;

counter means coupled to the output of said clock means for controlling the sequence of calculations performed by said calculating means, said counter means being incremented by said clock means output at least once during each engine revolution to initiate a predetermined calculation sequence between two successive counter increments; and digital-to-analog conversion means coupled to said calculating means and to said engine control devices for converting digital control signals generated by said calculating means into corresponding analog signals for controlling said engine;

wherein said calculating means comprises multiplying means for multiplying two members each having a maximum of 10 binary digits, adding means for adding two numbers each having a maximum of 10 binary digits, and a read/write memory coupled to said adding means for storing an output of said adding means; and said multiplexing means comprises first and second multiplexers coupled to inputs of said multiplying means for multiplying said numbers to be multiplied, third and fourth multiplexers for multiplexing said numbers to be added, second and third read/write memories coupled between outputs of said third and fourth multiplexers and inputs of said adding means, and means coupling said read/write memories to said counter means for controlling the read/write operation of said memories by the output of said counter means.

2. An analog-digital-analog control system for controlling control devices on an engine, comprising:

detecting means coupled to said engine for detecting engine performance data of more than one type;

analog-to-digital conversion means coupled to said detecting means for converting analog signals representing detected engine performance data into corresponding digital signals;

read-only memory means for storing predetermined reference data relating to said detected data;

calculating means coupled to said analog-to-digital conversion means and to said read-only memory means for calculating engine control signals from said reference and detected data;

multiplexing means coupled to said analog-to-digital conversion means and said calculating means for selecting one type of engine performance data from among said more than one type for calculation in said calculating means;

clock means for generating a plurality of clock pulses;

synchronizing means coupled to said clock means and to said engine for synchronizing the output of said clock means with the rotational speed of said engine;

counter means coupled to the output of said clock means for controlling the sequence of calculations performed by said calculating means, said counter means being incremented by said clock means output at least once during each engine revolution to initiate a predetermined calculation sequence between two successive counter increments; and digital-to-analog conversion means coupled to said calculating means and to said engine control devices for converting digital control signals generated by said calculating means into corresponding analog signals for controlling said engine;

wherein said calculating means comprises a multiplication circuit including an asynchronous storage register for storing the multiplicand; a shift register for storing the multiplier; multiplying means coupled to said multiplicand and multiplier storage registers for operating on values stored in said storage registers; a series-in-parallel-out product register coupled to said multiplying means for storing the product of said multiplier and multiplicand; and means coupling said multiplier shift register, said multiplying means, and said product register to said counter means for controlling the operation of said multiplication circuit as a function of the output of said counter means.

3. An analog-digital-analog control system for controlling control devices on an engine, comprising:

detecting means coupled to said engine for detecting engine performance data of more than one type;

analog-to-digital conversion means coupled to said detecting means for converting analog signals representing detected engine performance data into corresponding digital signals;

read-only memory means for storing predetermined reference data relating to said detected data;

calculating means coupled to said analog-to-digital conversion means and to said read-only memory means for calculating engine control signals from said reference and detected data;

multiplexing means coupled to said analog-to-digital conversion means and said calculating means for selecting one type of engine performance data from among said more than one type for calculation in said calculating means;

clock means for generating a plurality of clock pulses;

synchronizing means coupled to said clock means and to said engine for synchronizing the output of said clock means with the rotational speed of said engine;

counter means coupled to the output of said clock means for controlling the sequence of calculations performed by said calculating means, said counter means being incremented by said clock means output at least once during each engine revolution to initiate a predetermined calculation sequence between two successive counter increments;

digital-to-analog conversion means coupled to said calculating means and to said engine control devices for converting digital control signals generated by said calculating means into corresponding analog signals for controlling said engine; and control means for controlling injection of fuel to said engine, said engine control means including: a read/write memory coupled to said calculating means for storing an output of said calculating means corresponding to calculated injection times; at least two injection time counting circuits coupled to said read/write memory means and to said clock means for converting said calculated injection times into real injection times signals; further counting means initiated as a function of a predetermined angle of revolution of said engine; and means coupling said further counting means to said injection time counting circuits for alternately activating said counting circuits as a function of the output of said further counting means.

4. An analog-digital-analog control system according to claim 3, further comprising: distribution means coupled to said injection time counting circuits and to said further counting means for distributing said real time injection signals as a function of the output of said further counting means; and wherein said digital-to-analog conversion means comprises means coupled to outputs of said distributor means for controlling injection of fuel to said engine as a function of said real time injection signals at said distributor means outputs.

5. An analog-digital-analog control system for controlling control devices on an engine, comprising:
  detecting means coupled to said engine for detecting engine performance data of more than one type;
  analog-to-digital conversion means coupled to said detecting means for converting analog signals respresenting detected engine performance data into corresponding digital signals;
  read-only memory means for storing predetermined reference data relating to said detected data;
  calculating means coupled to said analog-to-digital conversion means and to said read-only memory means for calculating engine control signals from said reference and detected data;
  multiplexing means coupled to said analog-to-digital conversion means and said calculating means for selecting one type of engine performance data from among said more than one type for calculation in said calculating means;
  clock means for generating a plurality of clock pulses;
  synchronizing means coupled to said clock means and to said engine for synchronizing the output of said clock means with the rotational speed of said engine;
  counter means coupled to the output of said clock means for controlling the sequence of calculations performed by said calculating means, said counter means being incremented by said clock means output at least once during each engine revolution to initiate a predetermined calculation sequence between two successive counter increments;
  digital-to-analog conversion means coupled to said calculating means and to said engine control devices for converting digital control signals generated by said calculating means into corresponding analog signals for controlling said engine; and
  ignition advance control means for controlling the timing of engine ignition, including: a read/write memory coupled to said calculating means for storing an output signal from said calculating means corresponding to an ignition timing signal; an ignition advance calculation circuit coupled to said read/write memory for calculating a given ignition advance signal from said calculated ignition timing signal; and means coupled to said clock means, said synchronizing means and said ignition advance calculation circuit for activating said ignition advance calculation circuit to produce said given ignition advance signal as a function of a predetermined angle of revolution of said engine.

6. An analog-digital-analog control system according to claim 5, wherein said ignition advance calculation circuit generates a zero ignition advance signal when the number of revolutions per minute of said engine is no greater than a predetermined amount.

7. An analog-digital-analog control system for controlling control devices on an engine, comprising:
  detecting means coupled to said engine for detecting engine performance data of more than one type;
  analog-to-digital conversion means coupled to said detecting means for converting analog signals representing detected engine performance data into corresponding digital signals;
  read-only memory means for storing predetermined reference data relating to said detected data;
  calculating means coupled to said analog-to-digital conversion means and to said read-only memory means for calculating engine control signals from said reference and detected data;
  multiplexing means coupled to said analog-to-digital conversion means and said calculating means for selecting one type of engine performance data from among said more than one type for calculation in said calculating means;
  clock means for generating a plurality of clock pulses;
  synchronizing means coupled to said clock means and to said engine for synchronizing the output of said clock means with the rotational speed of said engine;
  counter means coupled to the output of said clock means for controlling the sequence of calculations performed by said calculating means, said counter means being incremented by said clock means output at least once during each engine revolution to initiate a predetermined calculation sequence between two successive counter increments;
  digital-to-analog conversion means coupled to said calculating means and to said engine control devices for converting digital control signals generated by said calculating means into corresponding analog signals for controlling said engine; and
  further multiplexing means coupled between said detecting means and said analog-to-digital conversion means for treating information detected by said detecting means in shared time, wherein said calculating means calculates injection timing and ignition advance of said engine in real and shared time.

8. An analog-digital-analog control system according to claim 7, further comprising: synchronous measurement means for sampling engine air intake, wherein said read-only memory contains signals corresponding to coefficients relating to engine advance, to temperature correction of water, oil and air, to starting enrichment, and to battery voltage, and signals corresponding to calues of a function serving as a full load reference and for permitting ignition advance calculations in said calculating means.

9. An analog-digital-analog control system for controlling control devices on an engine, comprising:
  detecting means coupled to said engine for detecting engine performance data of more than one type, wherein said detecting means comprises temperature detecting means, including logarithmic amplifying means for converting a resistance measurement into a proportional voltage;
  analog-to-digital conversion means coupled to said detecting means for converting analog signals representing detected engine performance data into corresponding digital signals;
  read-only memory means for storing predetermined reference data relating to said detected data;

calculating means coupled to said analog-to-digital conversion means and to said read-only memory means for calculating engine control signals from said reference and detected data;

multiplexing means coupled to said analog-to-digital conversion means and said calculating means for selecting one type of engine performance data from among said more than one type of calculation in said calculating means;

clock means for generating a plurality of clock pulses;

synchronizing means coupled to said clock means and to said engine for synchronizing the output of said clock means with the rotational speed of said engine;

counter means coupled to the output of said clock means for controlling the sequence of calculations performed by said calculating means, said counter means being incremented by said clock means output at least once during each engine revolution to initiate a predetermined calculation sequence between two successive counter increments; and digital-to-analog conversion means coupled to said calculating means and to said engine control devices for converting digital control signals generated by said calculating means into corresponding analog signals for controlling said engine.

10. An analog-digital-analog control system according to claim 9, further comprising impedance matching means interposed between said detecting means and said logarithmic amplifying means, wherein each impedance matching means comprises two field effect transistors coupled as differential amplifiers with a feedback loop.

11. An analog-digital-analog control system according to claim 9, wherein said temperature detecting means comprise resistance means having a substantially linear law of variation with respect to temperature.

12. An analog-digital-analog control system for controlling control devices on an engine, comprising:

detecting means coupled to said engine for detecting engine performance data of more than one type;

analog-to-digital conversion means coupled to said detecting means for converting analog signals representing detected engine performance data into corresponding digital signals, wherein said analog-to-digital converting means comprises means for converting detected pressure measurement signals and comprises a double-slope integrator circuit;

read-only memory means for storing predetermined reference data relating to said detected data;

calculating means coupled to said analog-to-digital conversion means and to said read-only memory means for calculating engine control signals from said reference and detected data;

multiplexing means coupled to said analog-to-digital conversion means and said calculating means for selecting one type of engine performance data from among said more than one type for calculation in said calculating means;

clock means for generating a plurality of clock pulses;

synchronizing means coupled to said clock means and to said engine for synchronizing the output of said clock means with the rotational speed of said engine;

counter means coupled to the output of said clock means for controlling the sequence of calculations performed by said calculating means, said counter means being incremented by said clock means output at least once during each engine revolution to initiate a predetermined calculation sequence between two successive counter increments; and digital-to-analog conversion means coupled to said calculating means and to said engine control devices for converting digital control signals generated by said calculating means into corresponding analog signals for controlling said engine.

13. An analog-digital-analog control system for controlling control devices on an engine, comprising:

detecting means coupled to said engine for detecting engine performance data of more than one type;

analog-to-digital conversion means coupled to said detecting means for converting analog signals representing detected engine performance data into corresponding digital signals;

read-only memory means for storing predetermined reference data relating to said detected data;

calculating means coupled to said analog-to-digital conversion means and to said read-only memory means for calculating engine control signals from said reference and detected data;

multiplexing means coupled to said analog-to-digital conversion means and said calculating means for selecting one type of engine performance data from among said more than one type for calculation in said calculating means;

clock means for generating a plurality of clock pulses;

synchronizing means coupled to said clock means and to said engine for synchronizing the output of said clock means with the rotational speed of said engine;

counter means coupled to the output of said clock means for controlling the sequence of calculations performed by said calculating means, said counter means being incremented by said clock means output at least once during each engine revolution to initiate a predetermined calculation sequence between two successive counter increments; and digital-to-analog conversion means coupled to said calculating means and to said engine control devices for converting digital control signals generated by said calculating means into corresponding analog signals for controlling said engine;

wherein said analog-to-digital converting means comprises a condenser, means for charging said condenser by a voltage being measured and for discharging said condenser, a converter coupled to said condenser and responsive to a linear portion of the discharge of said condenser, and means coupling said counter to said clock means for generating a number of binary bits proportional to said voltage being measured.

14. An analog-digital-analog control system for controlling control devices on an engine, comprising:

detecting means coupled to said engine for detecting engine performance data of more than one type;

analog-to-digital conversion means coupled to said detecting means for converting analog signals representing detected engine performance data into corresponding digital signals;

read-only memory means for storing predetermined reference data relating to said detected data;

calculating means coupled to said analog-to-digital conversion means and to said read-only memory means for calculating engine control signals from said reference and detected data;

multiplexing means coupled to said analog-to-digital conversion means and said calculating means for selecting one type of engine performance data from among said more than one type for calculation in said calculating means;

clock means for generating a plurality of clock pulses;

synchronzing means coupled to said clock means and to said engine for synchronizing the output of said clock means with the rotational speed of said engine;

counter means coupled to the output of said clock means for controlling the sequence of calculations performed by said calculating means, said counter means being incremented by said clock means output at least once during each engine revolution to initiate a predetermined calculation sequence between two successive counter increments;

digital-to-analog conversion means coupled to said calculating means and to said engine control devices for converting digital control signals generated by said calculating means into corresponding analog signals for controlling said engine; and wherein said detecting means comprises a non-linear temperature detector, and an inverse function of said non-linear detector is stored in said read-only memory means.

* * * * *